US008046193B2

(12) United States Patent
Yetter, Jr. et al.

(10) Patent No.: US 8,046,193 B2
(45) Date of Patent: Oct. 25, 2011

(54) DETERMINING PROCESS CONDITION IN SUBSTRATE PROCESSING MODULE

(75) Inventors: Forrest Gilbert Yetter, Jr., Austin, TX (US); Jeffrey M. Parker, Cedar Park, TX (US); Wayne G. Renken, San Jose, CA (US); John B. Pieper, Coralville, IA (US)

(73) Assignee: KLA-Tencor Corporation, Milpitas, CA (US)

( * ) Notice: Subject to any disclaimer, the term of this patent is extended or adjusted under 35 U.S.C. 154(b) by 613 days.

(21) Appl. No.: 12/107,007

(22) Filed: Apr. 21, 2008

(65) Prior Publication Data
US 2008/0228306 A1 Sep. 18, 2008

Related U.S. Application Data

(62) Division of application No. 11/174,022, filed on Jul. 1, 2005, now Pat. No. 7,363,195.

(60) Provisional application No. 60/586,159, filed on Jul. 7, 2004.

(51) Int. Cl.
*G06F 17/40* (2006.01)
*G06F 19/00* (2011.01)
(52) U.S. Cl. ............... 702/183; 702/182; 702/84
(58) Field of Classification Search .......... 702/183, 702/182, 84
See application file for complete search history.

(56) References Cited

U.S. PATENT DOCUMENTS

| 3,504,164 A | 3/1970 | Farrell et al. ............ 702/73 |
|---|---|---|
| 3,518,416 A | 6/1970 | Gebel et al. ............ 702/73 |
| RE32,369 E | 3/1987 | Stockton et al. ............ 342/368 |
| 5,262,944 A | 11/1993 | Weisner et al. ............ 600/300 |
| 5,435,646 A | 7/1995 | McArthur et al. ............ 374/185 |
| 5,444,637 A | 8/1995 | Smesny et al. ............ 702/127 |
| 5,564,889 A | 10/1996 | Araki ............ 414/806 |
| 5,893,796 A | 4/1999 | Birang et al. ............ 451/526 |
| 5,961,597 A | 10/1999 | Sapir et al. ............ 709/224 |
| 5,969,639 A | 10/1999 | Lauf et al. ............ 340/870.17 |
| 5,970,313 A | 10/1999 | Rowland et al. ............ 438/17 |
| 5,978,753 A | 11/1999 | Eidson ............ 702/188 |
| 6,010,538 A | 1/2000 | Sun et al. ............ 156/345.13 |
| 6,033,922 A | 3/2000 | Rowland et al. ............ 438/14 |
| 6,075,909 A | 6/2000 | Ressl ............ 385/14 |

(Continued)

FOREIGN PATENT DOCUMENTS

EP 1014437 A2 6/2000

(Continued)

OTHER PUBLICATIONS

U.S. Appl. No. 60/354,551, filed Feb. 6, 2003, to Ramsey et al., entitled "Wafer-Like Sensor".

(Continued)

*Primary Examiner* — Hal Wachsman
(74) *Attorney, Agent, or Firm* — Joshua D. Isenberg; JDI Patent

(57) ABSTRACT

A sensor network collects time-series data from a process tool and supplies the data to an analysis system where pattern analysis techniques are used to identify structures and to monitor subsequent data based on analysis instructions or a composite model. Time-series data from multiple process runs are used to form a composite model of a data structure including variation. Comparison with the composite model gives an indication of tool health. A sensor network may have distributed memory for a more simplified configuration.

11 Claims, 16 Drawing Sheets

U.S. PATENT DOCUMENTS

| | | | | |
|---|---|---|---|---|
| 6,100,506 | A | 8/2000 | Colelli, Jr. et al. | 219/446.1 |
| 6,125,420 | A | 9/2000 | Eidson | 710/242 |
| 6,159,073 | A * | 12/2000 | Wiswesser et al. | 451/6 |
| 6,173,240 | B1 * | 1/2001 | Sepulveda et al. | 703/2 |
| 6,190,040 | B1 | 2/2001 | Renken et al. | 374/185 |
| 6,280,289 | B1 | 8/2001 | Wiswesser et al. | 451/6 |
| 6,309,276 | B1 | 10/2001 | Tsai et al. | 451/5 |
| 6,313,903 | B1 | 11/2001 | Ogata | 355/27 |
| 6,325,536 | B1 | 12/2001 | Renken et al. | 374/161 |
| 6,377,130 | B1 | 4/2002 | Haman | 331/176 |
| 6,378,378 | B1 | 4/2002 | Fisher | 73/754 |
| 6,413,867 | B1 | 7/2002 | Sarfaty et al. | 438/689 |
| 6,442,445 | B1 * | 8/2002 | Bunkofske et al. | 700/108 |
| 6,472,240 | B2 | 10/2002 | Akram et al. | 438/18 |
| 6,510,395 | B2 * | 1/2003 | Stanke | 702/81 |
| 6,542,835 | B2 | 4/2003 | Mundt | 702/65 |
| 6,553,277 | B1 | 4/2003 | Yagisawa et al. | 700/204 |
| 6,594,589 | B1 | 7/2003 | Coss, Jr. et al. | 702/34 |
| 6,675,137 | B1 | 1/2004 | Toprac et al. | 703/2 |
| 6,691,068 | B1 | 2/2004 | Freed et al. | 702/187 |
| 6,725,402 | B1 | 4/2004 | Coss, Jr. et al. | 714/48 |
| 6,748,280 | B1 | 6/2004 | Zou et al. | 700/31 |
| 6,790,763 | B2 | 9/2004 | Kondo et al. | 438/622 |
| 6,812,717 | B2 | 11/2004 | Borden et al. | 324/752 |
| 6,828,225 | B2 | 12/2004 | Kondo et al. | 438/622 |
| 6,842,025 | B2 | 1/2005 | Gershenzon et al. | 324/759 |
| 6,862,484 | B2 | 3/2005 | Hayashi | 700/73 |
| 6,916,147 | B2 | 7/2005 | Suh et al. | 414/416.08 |
| 6,982,953 | B1 | 1/2006 | Swales | 370/218 |
| 7,151,366 | B2 | 12/2006 | Renken et al. | 324/158.1 |
| 2001/0014520 | A1 | 8/2001 | Usui et al. | 438/586 |
| 2002/0061758 | A1 | 5/2002 | Zarlengo et al. | 455/517 |
| 2002/0078770 | A1 | 6/2002 | Hunter | 73/865.9 |
| 2002/0109590 | A1 | 8/2002 | Parsons | 340/540 |
| 2002/0148307 | A1 | 10/2002 | Jonkers | 73/865.9 |
| 2002/0161557 | A1 | 10/2002 | Freed | 702/188 |
| 2002/0167326 | A1 * | 11/2002 | Borden et al. | 324/752 |
| 2002/0172097 | A1 | 11/2002 | Freed | 368/108 |
| 2002/0177916 | A1 | 11/2002 | Poolla et al. | 700/108 |
| 2002/0177917 | A1 | 11/2002 | Polla et al. | 700/108 |
| 2002/0186662 | A1 | 12/2002 | Tomassetti et al. | 370/254 |
| 2002/0193957 | A1 | 12/2002 | Freed | 702/104 |
| 2003/0209097 | A1 | 11/2003 | Hunter | 73/865.9 |
| 2003/0223057 | A1 | 12/2003 | Ramsey et al. | 356/147 |
| 2004/0078463 | A1 | 4/2004 | Pearlman et al. | 709/224 |
| 2004/0107066 | A1 | 6/2004 | Poolla et al. | 702/136 |
| 2004/0131226 | A1 | 7/2004 | Poolla | 382/100 |
| 2004/0225462 | A1 | 11/2004 | Renken et al. | 702/94 |
| 2004/0249604 | A1 | 12/2004 | Poolla et al. | 702/182 |
| 2004/0267501 | A1 | 12/2004 | Freed et al. | 702/184 |

FOREIGN PATENT DOCUMENTS

| | | |
|---|---|---|
| EP | 1014437 A3 | 6/2000 |
| JP | 07-282146 | 10/1995 |
| JP | 11-016798 | 1/1999 |
| WO | WO 00/68986 | 11/2000 |
| WO | WO 02/17030 A2 | 2/2002 |
| WO | WO 03/067183 A2 | 8/2003 |
| WO | WO 03/067183 A3 | 8/2003 |
| WO | WO 03/103024 A2 | 12/2003 |
| WO | WO 2004/051713 A2 | 6/2004 |

OTHER PUBLICATIONS

U.S. Appl. No. 60/525,710, filed Nov. 29, 2003, to Mundt et al., entitled "Sensor Apparatus Automated Management Methods and Apparatus".

U.S. Appl. No. 60/285,613, filed Apr. 19, 2001, to Freed et al.; entitled "Firmware, Methods, Apparatus, and Computer Program Products for Wafer Sensors".

U.S. Appl. No. 60/285,439, filed Apr. 19, 2001, to Freed et al.; entitled "Methods Apparatus, and Computer Program Products for Obtaining Data for Process Operation, Optimization, Monitoring, and Control".

Freed et al.; "Autonomous On-Wafer Sensors for Process Modeling, Diagnosis, and Control", IEEE Transactions on Semiconductor Manufacturing, vol. 14, No. 3, Aug. 2001, pp. 255-264.

Freed; "Wafer-Mounted Sensor Arrays for Plasma Etch Processes", Dissertation, Univ. of CA. Berkeley, Fall 2001.

Baker et al.; "A Novel in Situ Monitoring Technique for Reactive Ion Etching Using a Surface Micromachined Sensor," IEEE Transactions on Semiconductor Manufacturing, vol. 11, No, 2, May 1998, pp. 254-264.

U.S. Appl. No. 60/411,857, filed Sep. 18, 2002, to Poolla, entitled "Methods and Apparatus for Equipment matching and Characterization".

Schneider Electric, "In-Situ particle Monitor (ISPM) Improves Wafer Yield for Semiconductor Customer: Advanced Process Control Utilizing Reliable, Off-the-Shelf Components Creates Rapid ROI", brochure, Mar. 2002, 6 pages.

Brooks Automation "SMC-Patterns Option for Brooks-Sentinel TM", brochure, 2001, 2 pages.

Brooks Automation, "Patterns TM Software", Brochure, 2000, 6pages.

Semiconductor International, "Fault Detection: Problem Solving From the Process Perspective", Feb. 2001, vol. 24 No. 2, 6pages.

O'Sullivan, Paul J. et al., "Using UPM for Real-Time Multivariate Modeling of Semiconductor Manufacturing Equipment" dated Nov. 1995, http://www.triant.com/content-techpapers.html, 15 pages.

Triant Technologies, Inc. "Data Flow", http:// www.triant.com/works.html, downloaded Jun. 10, 2004, 5 pages.

Triant Technologies, Inc. "Universal Process Modeling", http://www.triant.com/works.html, downloaded Jun. 10, 2004, 4 pages.

Triant Technologies, Inc. "Model Ware/RT Improves Overall Equipment Efficiency", http://www.triant.com/works.html, downloaded Jun. 10, 2004, 4 pages.

Brooks Automation, "Cornerstone Distribution Fitting and Process Capability", http://brooks.com/pages/1228_cornerstone_distribution_fitting_and_process_capability, downloaded Jun. 10, 2004, 2 pages.

SiAutomation, "Fault Detection & Classification: Maestria", http://www.siautomation.com/ prod_gpack.htm, downloaded Jun. 10, 2004, 2 pages.

Olszewski, Robert T., "Generalized Feature Extraction for Structural Pattern Recognition in Time-Series Data", School of Computer Science, Carnegie Mellon University, Thesis, 2001, 122 pages.

Notification of Transmittal of the International Search Report and the Written Opinion of the International Searching Authority, or Declaration, in corresponding PCT/US2005/023959, dated Feb. 3, 2006, 15 pages.

Office Action dated Nov. 13, 2006 for U.S. Appl. No. 11/174,022.

Final Office Action dated May 10, 2007 for U.S. Appl. No. 11/174,022.

Notice of Allowance dated Dec. 21, 2007 for U.S. Appl. No. 11/174,022.

* cited by examiner

DETERMINING PROCESS CONDITION IN SUBSTRATE PROCESSING MODULE

CROSS REFERENCE TO RELATED APPLICATIONS

This application claims the benefit of U.S. Provisional Application No. 60/586,159, filed on Jul. 7, 2004 which application is hereby incorporated by reference in its entirety. This application is a divisional of U.S. application Ser. No. 11/174,022, filed on Jul. 1, 2005, now U.S. Pat. No. 7,363,195. U.S. application Ser. No. 11/174,022 claims priority to U.S. Provisional Application No. 60/586,159.

BACKGROUND OF THE INVENTION

This invention relates to systems for collecting and analyzing data and using analysis of data for performance monitoring and in particular to the use of such systems on tools that process substrates.

Substrate processing equipment is used to process a variety of different substrates in different industries. Semiconductor substrates, such as silicon wafers, generally go through multiple substrate processing tools during manufacture of integrated circuits. Such tools perform different processes including cleaning, depositing material, removing material, forming patterns on the substrate and heating the substrate. Some tools have different modules that perform different processes such as a cleaning process in a cleaning module prior to a deposition process in a deposition module. Some tools have the capability to perform multiple tasks in the same process chamber such as both a cleaning step and a process step. Tools are also used to perform measurements on substrates at various points in the production of integrated circuits. Within a tool or a module, a process takes place that may affect the substrate in some way. Careful control of a process may be necessary in order for the integrated circuit produced to perform properly. For example, when a layer is deposited, it must generally have a thickness that is within a particular range. This range must be maintained across the substrate so that each integrated circuit has a layer of the correct thickness. Otherwise, some integrated circuits on a substrate may have too thick or too thin a layer and may not function correctly. To maintain control of a process, there may be certain process parameters that need to be controlled. For example, temperature, pressure, gas flow rate or chemical concentration may need to be carefully controlled. In addition to controlling a process parameter for a process module in general, the uniformity of a process parameter at different points across a substrate may also be controlled. Many tools include sensors to monitor such process parameters. Some tools use feedback and other types of control based on the measurements obtained from sensors. Substrate processing tools are used for other substrates including other semiconductor substrates such as Gallium Arsenide, Indium Phosphide and Indium Gallium Arsenide and for Flat Panel Display (FPD) substrates.

Various sensors are available for monitoring process parameters. Sensors may be used to measure properties such as temperature, pressure, gas flow rate, gaseous chemical composition within a chamber, position within a chamber, ion current density, ion current energy, light energy density, and vibration and acceleration of a wafer. Sensors may be mounted to a tool or may form part of a Process Condition Measuring Device (PCMD) such as those described in U.S. patent application Ser. No. 10/718,269 filed on Nov. 19, 2003, now U.S. Pat. No. 7,151,366, which application is hereby incorporated in its entirety by this reference.

Tool health may be determined from measurements made by sensors. Tool health is a general term used to describe whether the tool is performing in an acceptable fashion. This generally means that it is achieving a designated process within some limits set by a user.

For certain applications it is useful to record data from a process tool in a separate unit called a data logger. The data may come from the tool through a communications port or may come from sensors or test points connected or dedicated to the data logger. The data are typically logged and later analyzed to better understand the process or to diagnose a problem that may exist in a process module. Current data loggers suffer from certain limitations. Dedicated leads or cables are generally needed for each sensor, sensors may be difficult to individually configure and software used to analyze data is often complex and difficult to customize for a particular application. Some currently used methods for reporting Sensor Data such as SECS/GEM typically report their data at a uniform or non-uniform frequency, sometimes a low frequency such as 1-5 Hertz or lower.

Therefore, there is a need for a user configurable data collection and analysis system. There is also a need for a data collection and analysis system that identifies process anomalies in a simple manner.

SUMMARY OF THE INVENTION

An apparatus for collecting data includes multiple transducers that are connected to a network by smart transducer interface modules (STIMs). A STIM acts as a signal conditioner and interface unit between a transducer such as a sensor and a local interface controller or a network. A STIM may simply convert an analog input from a sensor to a digital output or may perform more complex signal processing or adjustment. An output may be scaled by a STIM or may be modified by some function. An output of a thermocouple of one type may be converted to mimic the output of a thermocouple of a different type. A ribbon or other type of cable may be used to connect sensors that are attached to a substrate processing tool such as those used in the semiconductor industry. Multiple STIMs may be connected to a ribbon or other type of cable to allow multiple sensor outputs to be accessed over a network. STIMs may be configured to allow different sensors to be sampled at different rates. This may allow the network to be more efficiently used, for instance where different process parameters are measured that change at different rates.

A sensor network may include one or more memory chips that contain information that helps to configure the data collection, storage and analysis operations of the assembled sensor network or of a platform in communication with the sensor network. Memory chips may be located in a cable, a STIM, a STIM hub, a controller or in a connector. Stored information may include identification data, the types of sensors used and calibration data. By distributing data to dispersed points within a sensor network, configuration and reconfiguration is made easier and may be at least partially automated.

A system for analyzing data uses syntactic pattern recognition methods to identify or analyze patterns in collected data representing a process parameter over time. Where the same process is repeated, such patterns occur in the data for each process repeat or run. Teaching data may be gathered over multiple process runs to learn what patterns are present and to determine the degree of normal observable variation exists in particular patterns from one run to another. A model is developed from analysis of the data that gives patterns or structures associated with portions of collected data, locations of boundaries between portions of data and measured variation between portions of data from different waveforms. Once the teaching data are analyzed to obtain a model for a portion of data, limits may be set for acceptable performance based on the measured mean and variations or based on some other criteria. A user may directly set limits if desired. Data are then collected from working process runs in the same manner as teaching data were collected. The working process data are compared to the model and to any automatically calculated or user-defined limits. If the working process data exceed a limit then an alarm may be sent to indicate this condition.

DETAILED DESCRIPTION OF THE PREFERRED EMBODIMENTS

Data Collection

Data collection from sensors and other signal producing apparatus on a processing tool may be done in many different ways. Sensors that are part of the tool may be used. In some cases, the tool may be connected so that the outputs of the sensors are sent via a network and are available for analysis. However, such an output may be limited because the configuration of the sensors is determined by the tool manufacturer and may not be easy or acceptable to reconfigure. The locations of the sensors may be fixed so that they are difficult or impossible to move. Also, the frequency with which sensor measurements are sent via the network may be limited to a low frequency such as 1-5 Hertz or lower and may not be configurable by the user. Also, in some systems, data may not be reported regularly in a deterministic or uniform time ordered pattern because of other system operations. Reporting data for data logging may not be a high priority and therefore may not be consistently carried out on-time so that data is received infrequently or irregularly or both infrequently and irregularly.

Figure 1A:
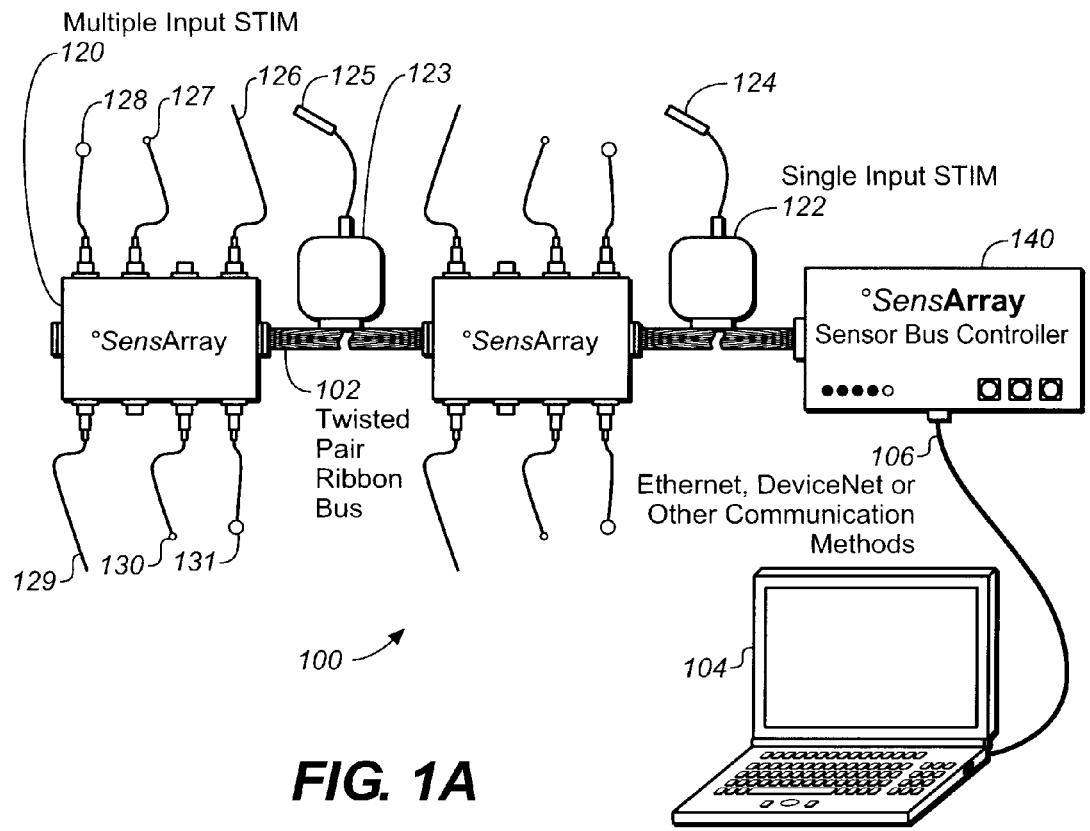
FIG. 1A shows a data collection system including a sensor network.

Another system of data collection uses sensors that may be configured to the requirements of the user. In one example, such sensors may be connected by a ribbon or other type of cable that allows sensors to be positioned at any location along the ribbon or other type of cable. FIG. 1A shows a sensor network 100 that is an example of a set of sensors connected by a ribbon cable 102. In this example, sensors are connected to Smart Transducer Interface Modules (STIMs) 120, 122. A STIM takes an input from a sensor (e.g. sensors 124-131) and provides an output that is compatible with network communication. The input may be an analog voltage from a thermocouple, while the output may be in a digital form that is compatible with a network protocol such as Ethernet, DeviceNet or serial communications. The output may be provided in engineering units not needing further conversion prior to use. The combination of a sensor and a STIM may be considered as a node in a network. A personal computer or other device capable of storing and analyzing data may be connected to the network. FIG. 1A shows a laptop computer 104 connected by an Ethernet connection 106. In one embodiment, a DeviceNet network is used and a personal computer is connected to the DeviceNet network to accept data from the network. In this manner, the personal computer may gather data from a variety of sensors that are positioned as required by the user. This type of data collection system is extremely flexible. It may be installed easily with sensors and sensor signal conditioners or STIMS located wherever they are needed. Additional sensors may be added to the system as required. The ribbon cable 102 is unobtrusive and may be run so that it does not interfere with tool components.

The sensor bus controller (or aggregator) 140 is attached to the ribbon cable 102 to allow a laptop or other device to be linked to the sensor network. The sensor bus controller 140 is also used to configure the sensors 124-131. Thus, the sensor network 100 may be configured both by configuration of the sensors 124-131 and by configuration of the sensor bus controller 140. Configuration information can be stored at numerous places in the overall system. The STIM memory may contain configuration and calibration information, the connector to the sensor or voltage input may have configuration information, the STIM hub may have configuration information as well as the aggregator and the main user interface. When a connector having such information in a memory is used as a connector to the sensors and/or voltage input, it can provide a means to rapidly guide the operator through a set up based on previous configuration in the case of a portable application.

One limitation of certain prior art data gathering techniques that carry out data-logging using preexisting networks, such as SECS/GEM networks, is that the frequency of communication may be predetermined and may not be configurable. Such systems may use a low frequency such as 1 Hertz, which may not be suitable for data logging and monitoring for processes that have rapidly changing process parameters. Some process tools have process parameters that change slowly, such as temperature in a furnace, while other tools have rapidly changing process parameters, such as temperature in a Rapid Thermal Processing (RTP) system. Within some modules, certain process parameters may change rapidly while others change slowly. Therefore, it is desirable to be able to configure the frequency of data collection from a sensor according to the particular application. In one embodiment, a STIM is provided that may be configured to provide sensor data at a frequency selected by a user. Where multiple STIMs are connected to the same network, certain STIMs may provide data at a low frequency while others provide data at a high frequency. This allows more efficient use of the available bandwidth of the network. Interface modules shown in FIG. 1 are STIMs 120 and 122. Two types of STIMs are shown, single input modules such as STIM 122 that have a single input from a single sensor and multiple input modules such as STIM 120 that have more than one input from more than one sensor, (here, sensors 126-131). Different types of sensors may be connected to the same multiple input STIM. For example, STIM 120 of FIG. 1 may have a thermocouple, an RTD and a pressure sensor connected to it. STIM 120 has 8 ports for connecting sensors but only uses 6 ports for sensors 126-131. Thus, both the number and type of sensors connected to multiple input STIM 120 may be modified according to a user's requirements. Also, different sensors may be used with different STIMs on the same network. For example, in FIG. 1 one single input module STIM 122 may be connected to a chemical concentration sensor 126 while the other single input module STIM 123 is connected to a gas flow sensor 125.

In another embodiment, a STIM may convert an input from a sensor of a first type to an output that is equivalent to that of a sensor of a different type. For example, a STIM may receive an input from a thermocouple of a first type and produce an output that is equivalent to the output that would be produced by a different type of thermocouple. Thus, the output of a type K thermocouple may be converted by a STIM to provide an output that mimics that of a type T thermocouple. This may be advantageous where a data collection system is configured for type T thermocouples but a user wishes to use a type K thermocouple. This also provides for a conversion from one sensor type to another, such as a RTD or optical sensor input being converted to a Type T thermocouple signal. This also provides a means to monitor a thermocouple by making the input and output thermocouple types the same. The digital data between the input and output can be used for measurement or monitoring purposes.

In other embodiments a STIM may act as a digital voltmeter by measuring an analog voltage received from a sensor and outputting a digital signal that indicates the analog voltage received. An STIM may also perform the conversion of a thermocouple voltage to a temperature. Thus, an analog voltage may be received from a thermocouple and the STIM may calculate the temperature of the thermocouple from the voltage and send a digital signal that indicates the calculated temperature in Engineering units of temperature. A STIM may also perform a similar function with a Resistance Temperature Detector (RTD) where a resistance is measured and a digital signal is sent by the STIM indicating the temperature of the RTD. In any of these examples an output may be modified according to the configuration of the STIM as determined by a user. For example, a STIM connected to a pressure sensor may be configured to send a pressure reading to a network that is higher or lower than the pressure indicated by a signal from a sensor. In some applications, this may be of benefit because it means that the actual pressure is different than the pressure reading available on the process chambers information network. Where a process chamber is pumped to some predetermined base pressure before a process run, the actual pressure would be lower than the predetermined base pressure at the start of the process run. This lower pressure may improve process performance. A STIM may also be configured to adjust an output in various ways. An offset may be provided that adjusts any output signal by a fixed amount or a scaling factor may be provided so that the output is multiplied by a constant. Alternatively, the output may be modified by some function such as a polynomial so that a more complex mapping of input to output is achieved. A STIM may also be used with transducers other than sensors. In one example, a STIM may operate as a relay card that opens or closes one or more relays in response to communication received via a network. The relays may be used to control valves, signal lights or other hardware.

According to an embodiment of the present invention, a sensor network includes unique identification data at nodes that allows the configuration of the network to be automatically updated in software when a hardware change is made. Typically, each node in a network has a unique network address that allows communication to be individually directed to that node. The network addresses of nodes are assigned during initial configuration and may be updated whenever there is a change in the physical configuration of the nodes. For example, it may be necessary to set the network addresses of the nodes to make sure that no two nodes share the same network address. When a new node is added, it must have a network address that is different to the network addresses of the nodes already present in the network. In addition to configuring the network addresses of the nodes, certain information about each node is generally collected and entered into analysis software so that data from the nodes is correctly interpreted. For example, the number of sensors at a node and the type of each sensor may be entered. Additional data about the sensors or STIM may also be entered. While such data may be entered manually to reflect the hardware, this may give rise to errors and is time consuming. An automated system for collecting such data and providing it to a software application may improve accuracy and makes any reconfiguration quicker and easier.

Figure 1B:
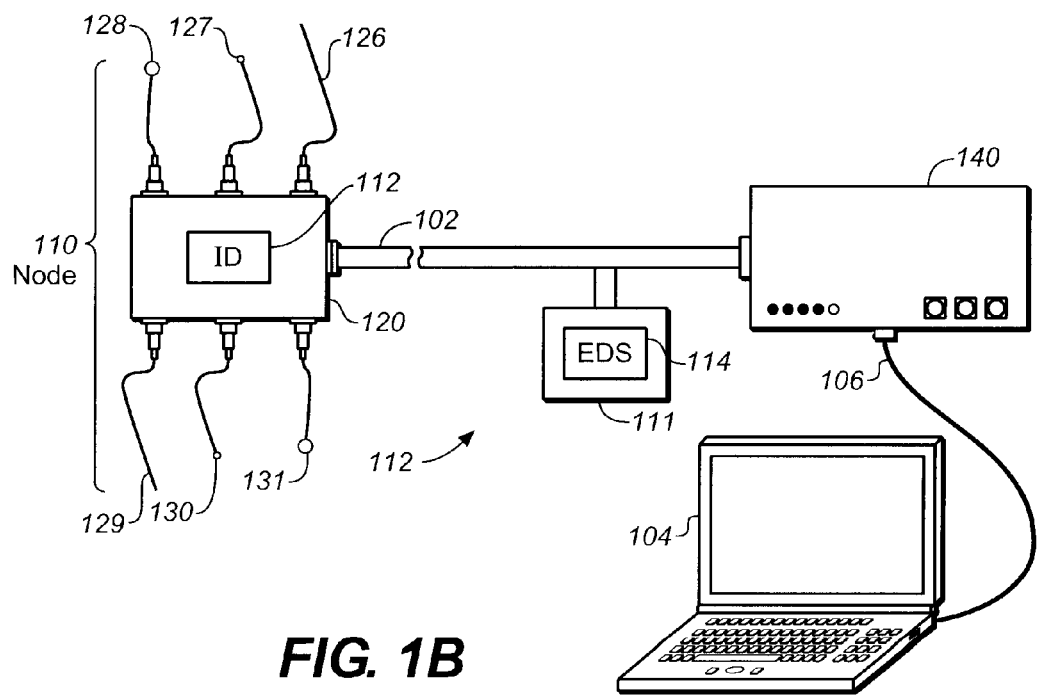
FIG. 1B shows a data collection system having automated configuration.

FIG. 1B shows a simplified view of sensor network 112 with STIM 120 connected to hub 111 and controller 140 by cable 102. STIM 120 and attached sensors 126-131 form a node 110 in the sensor network. Each node in the network, such as node 110, has a unique network address for communication with other nodes. Controller 140 and hub 111 also have unique network addresses. Node 110 contains identification data (ID) 112. ID 112 may include the address of node 110 and information about the node. Such information may include the number of sensors (here six sensors, sensors 126-131) and the types of sensors (e.g. thermocouple, RTD and pressure sensor). ID 112 may also include additional data such as calibration data for a sensor or information regarding any data conversion being carried out by STIM 120. Information such as ID 112 may be stored as separate information associated with each sensor or may be stored as a unit associated with a STIM. When a network is initially turned on, or when it is reconfigured, information from nodes of the network may be sent to a central location for configuration of the software. Thus, when node 110 is connected to network 112, hub 111 may send a command to node 110 requesting identification data. In response, node 110 sends ID 112 to controller 140 over cable 102. Information from all the nodes of the network may be assembled by a hub to make the configuration data available at a single location. Here, ID 112 and similar IDs from other nodes is assembled by hub 111 to generate a self descriptive Electronic Data Sheet (EDS) 114. The EDS 114 may then be provided to a unit that uses the configuration information. For example, data analysis software running on laptop computer 104 may request EDS 114. EDS 114 is then sent to laptop computer 104 via Ethernet connection 106. Data analysis software can then correctly interpret the data sent by nodes such as node 110. Information from EDS 114 may also be provided to a user of laptop computer 104 for configuration of the software by the user. Where a DeviceNet network is used, an ID may be stored as a DeviceNet Parameter Object that is stored in a STIM, sensor cable or sensor connector. An EDS may be embedded in a DeviceNet file object that is stored in the hub.

In another embodiment of the present invention, unique network addresses may be provided for each node in a network by connecting a separate address module to each node, the address module containing the address of the node. A connector is provided at each node for connection of an address module. In one example, address modules are preconfigured to have different addresses. In another example, address modules may be configured in-situ to have different addresses. Address modules may have a visible indicator of the network address that they provide.

Figure 1C:
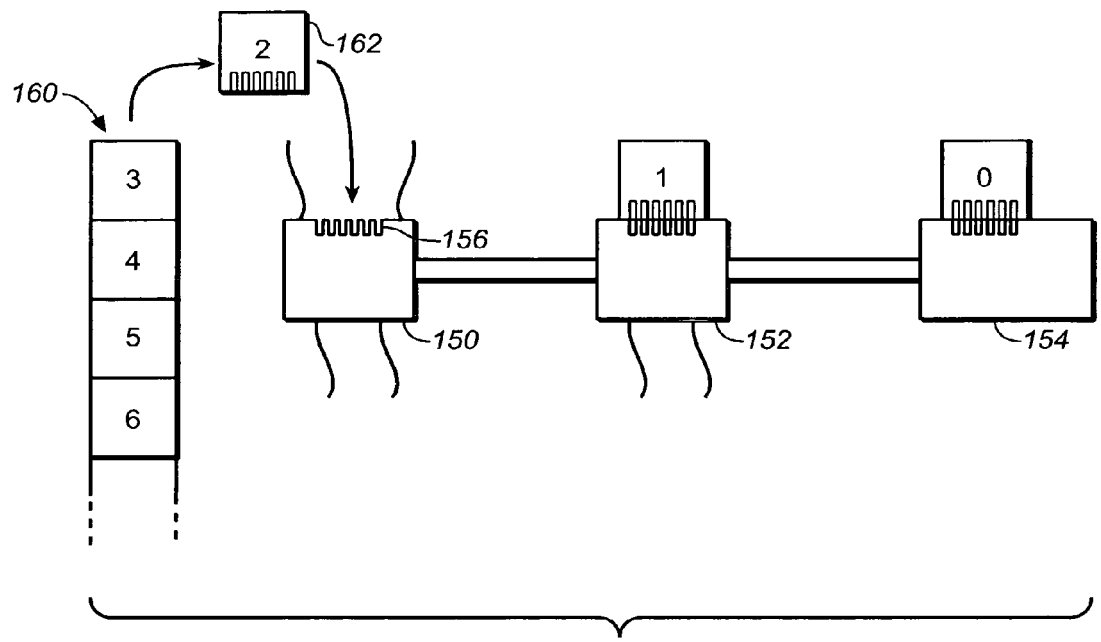
FIG. 1C shows a sensor network having network addresses assigned by separate address modules.

In a first example shown in FIG. 1C, a set of address modules 160 are provided with each address module having a unique address. For DeviceNet networks, 64 addresses (0-63) may be provided. Two STIMs 150, 152 are shown connected to a controller 154. STIMs 150, 152 and controller 154 each have a connector for an address module. For example, connector 156 is provided in STIM 150. To assign an address to a node, an address module is connected to the connector of the node. Thus, to configure STIM 150 with address "2," address module 162, having network address "2," is inserted in connector 156. Circuitry within STIM 150 obtains the address "2" from address module 162 and then uses this as the network address for STIM 150. A set of address modules, each with a unique address may be provided for configuring a network so that no two nodes will have the same address. Such address modules may be simple and cheap with the address recorded using fuses, jumpers or other hardware. The address of the address module may be written or labeled on the outside of the memory module so that it is clearly visible. Where the memory module has an address that is permanently stored (not reconfigurable) the address may be written in a permanent manner. For example, a set of address modules may initially be physically joined together as a "stick" from which individual units are broken off to be used. In some cases the controller is preconfigured to have address "0." The controller may be connected to the network through a unit that handles communication between the controller and the network called a "Master/scanner." Where the controller is preconfigured with address "0" the address module with address "0" may be discarded, or a set of address modules may be provided that does not include an address module with address "0."

Figure 1D:
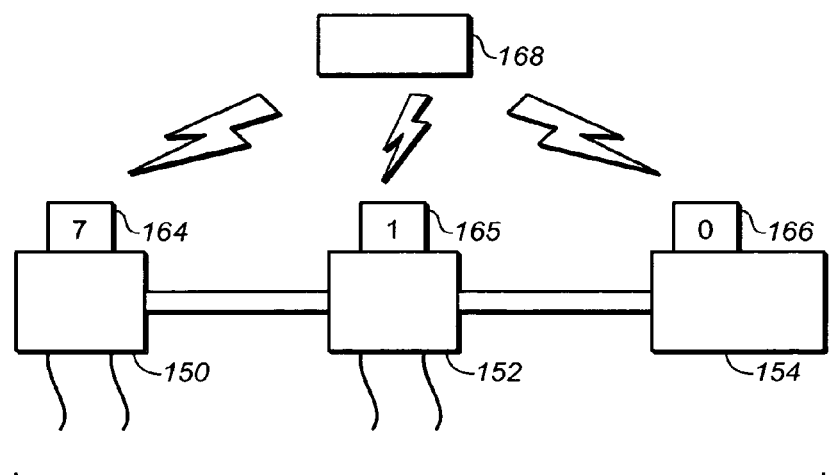
FIG. 1D shows a sensor network having network addresses assigned by configurable address modules

In another example, a memory module may be reconfigurable so that the network address it provides may be changed at any time. Such memory modules may still display a visual indicator of the network address provided. For example, a LED or LCD display may show the current network address of the memory module in a visible manner. A reconfigurable address module may have a communication circuit that allows it to communicate with a configuration unit. FIG. 1D shows reconfigurable address modules 164-166 connected to STIMs 150, 152 and controller 154 to provide network addresses for STIMs 150, 152 and controller 154. Configuration unit 168 is in communication with address modules 164-166. Communication unit 168 can read the network addresses of address modules 164-166 and can modify the addresses. For example, configuration unit 168 may read the network address of address module 164 to be "7." If there is another node in the system that has the network address "7" then configuration unit 168 may change the network address "7" of address module 164 to some other network address, thus changing the network address of the node containing STIM 150. An optical, radio frequency (RF), infrared (IR) or other communication system may be used between configuration unit 168 and address modules 164-166. In order for the configuration unit 168 to be able to separately identify and communicate with address units that have the same network address, a separate unique configuration address may be provided for each address module. A configuration address may be unique to each address module manufactured and is not limited to the range of network addresses available. Thus, in a system where network addresses are limited to the range 0-63, two or more nodes may share the same network address but will have unique configuration addresses so that a configuration unit can distinguish between them. The configuration unit receives the network addresses from the address modules of all nodes, recognizes which address modules share the same network addresses and sends a command to an address module to change its network address if necessary to eliminate any duplicate addresses.

Figure 1E:
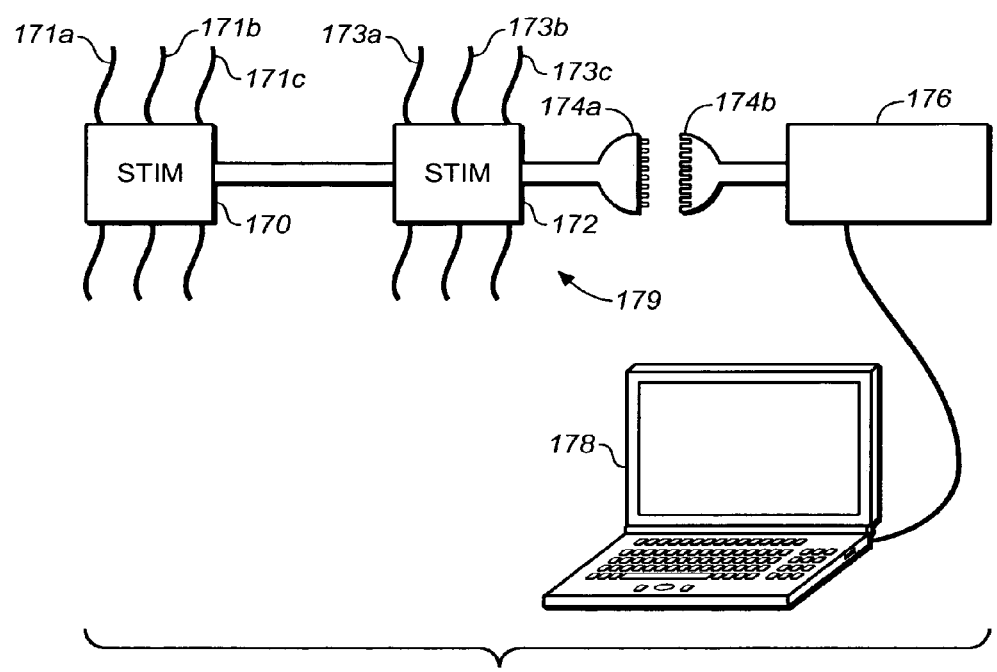
FIG. 1E shows a sensor network having STIMS and a connector to connect to a corresponding connector of a controller.

FIG. 1E shows a sensor network 179 having a connector 174a that allows sensor network 179 to be connected to a corresponding connector 174b that is attached to controller 176. Controller 176 is in turn connected to laptop 178, though in some examples the functions of controller 176 may be performed by laptop 178 so that a separate controller is unnecessary. Sensor network 179 may be attached to a process tool with sensors positioned at desired locations. When sensor network 179 is in use, connector 174a is connected to connector 174b so that controller 176 is in communication with STIMs 170, 172 and receives data gathered by sensors 171a-c, 173a-c. When sensor network 179 is not in use, connector 174a is disconnected from connector 174b so that controller 176 (and laptop 178) may be removed and used elsewhere. In this way, network 179 may be permanently left attached to a process tool while controller 176 is used elsewhere. This saves time in relocating sensors and avoids variation caused by changes in sensor location. When controller 176 is reattached, STIMs 170 and 172 provide information to controller 176 regarding sensors 171a-c, 173a-c. This may include identification data. In some cases, controller 176 may recognize network 179 when connected and use information regarding network 179 that is stored in controller 176.

Figure 1F:
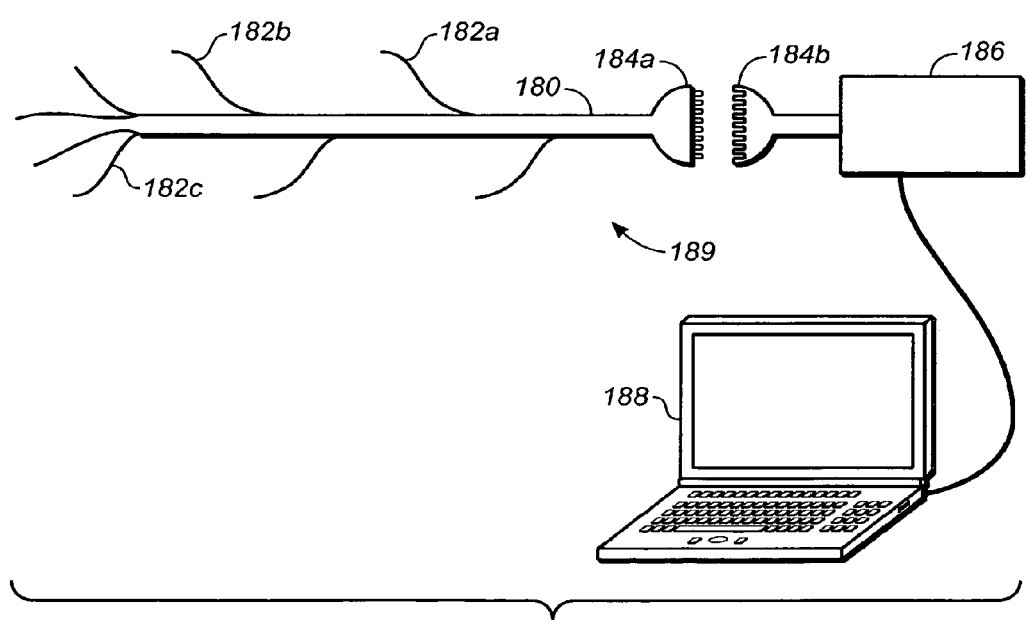
FIG. 1F shows a sensor network without STIMS having a connector to connect to a unit that performs both STIM and controller functions.

FIG. 1F shows another example of a sensor network 189 that may be attached to a process tool. Sensors 182a-182c connect to cable 180, which terminates in connector 184a. Connector 184a may be connected with corresponding connector 184b so that network 189 may communicate with a STIM or a collection of STIMS or a controller. Sensor network 189 may be left attached to a process tool when not in use. Thus, sensors 182a-c remain in the same locations and are not disturbed. When sensor network 189 is to be used, connector 184a is connected with connector 184b so that unit 186 is in communication with sensor network 189. Unit 186 can combine the functions of a STIM and a controller in a single unit, or be comprised of separate STIM units as with a STIM hub and a controller. In this example, the hardware that remains on the process tool (sensor network 189) is relatively simple and cheap so that the cost of having multiple tools with such hardware is reduced. Sensors 182*a-c*, cable 180 or connector 184*a* may contain memory chips. Such memory chips allow information regarding sensor network 189 to be stored in sensor network 189 so that when unit 186 is connected, software in unit 186 or laptop 188 may be rapidly configured for sensor network 189. Information stored in memory chips may include the types of sensors used and calibration information and information on the nature of the configuration application including such information as tool description, identification, user information, location etc. In some examples, software on laptop 188 may be configured for network 189 when first connected. Then, if reconnected at a later time, software on laptop 188 may recognize that it is again connected to network 189 and may use stored configuration information to automatically configure software components as before or aid the operator in the selection of appropriate configurations for use or editing.

Figure 1G:
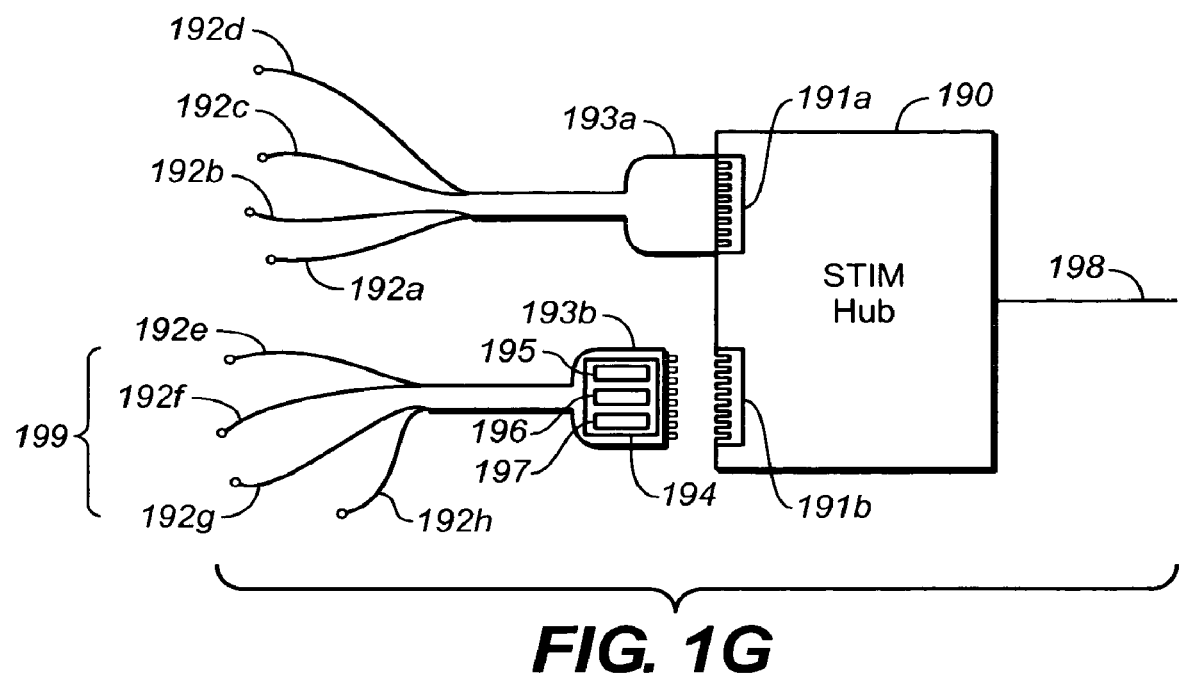
FIG. 1G shows STIMS with signal conditioning circuitry, computer processor and memory in a connector of a sensor that connects to a corresponding STIM Hub that assembles a composite EDS of all STIMS and communicates to a controller

In another embodiment, a STIM is incorporated in the connector attached to a sensor or group of sensors. Such a STIM may include a CPU and an analog to digital converter so that the outputs of the attached sensors may be converted to a digital format. A memory may also be included in the connector to allow identification and other information to be stored. FIG. 1G shows STIM hub 190 having ports 191*a*, 191*b* for connecting sensors. One or more sensors may be connected using a single connector in this configuration. For example, sensors 192*a*-192*d* are attached to connector 193*a*, which is connected to hub 190 through port 191*a*. Sensors 192*a*-192*d* may be of the same type so that circuits in connector 193*a* may be shared by sensors 192*a*-192*d*. Sensors 192*e*-192*h* are attached to connector 193*b*, which is shown removed from port 191*b*. Connectors 193*a*, 193*b* include STIMS so that the output from connectors 193*a*, 193*b* are digital and may be in a format that is not specific a particular type of sensor. Connector 193*b* includes STIM 194. STIM 194 includes various circuits including analog to digital conversion circuits 195, CPU circuit 196 and memory circuit 197. STIM hub 190 receives the digital signals from connectors 193*a*, 193*b* and provides an output signal that can be used by other devices. STIM hub 190 may include one or more CPUs and may also include memory circuits. Communication between ports 191*a*, 191*b* and the CPU of STIM hub 190 may be via a Serial Peripheral Interface (SPI) bus. A connector and attached sensors connected to a port may be considered a node in such a configuration. Thus, sensors 192*e*-192*h* and connector 193*b* containing STIM 194 form node 199.

The output signal from STIM hub 190 may be sent via a network such as a DeviceNet network, a serial connection or other suitable communication system. STIM hub 190 is shown connected to a DeviceNet network by cable 198. In such a network, STIM hub 190 forms a single DeviceNet node. Multiple STIM hubs may be connected together in such a network, thus allowing a large number of sensors to be used. In the configuration shown in FIG. 1G, STIM hub 190 manages communication between nodes such as node 199 and any unit that may use the data gathered by such nodes. STIM hub 190 can be used to create an EDS that contains configuration information regarding the sensors connected to STIM hub 190 as described before. The EDS may then be sent to a software application where it is used to configure software to accurately reflect the hardware in place. The example of FIG. 1G, with STIMs incorporated in connectors has the advantage that circuits that are particular to a sensor, such as signal conversion circuits and memory circuits, are incorporated in a connector for that sensor, while communication circuits, which may be generic for all sensors, are in a separate unit (a STIM hub). This allows for easy configuration.

Providing information about a network in a memory device within the network itself makes software configuration easier and may allow automatic or highly automated configuration. Providing information about a particular network component in or near that component makes reconfiguration of the network easier. For example, where a sensor contains a memory chip in its cable, whenever the sensor is moved to a new location, the information stored in the memory chip can be read and the network can be reconfigured in software to indicate the new location or application.

Data collection systems such as sensor networks of FIGS. 1A-1F may be used to collect data to characterize a tool or to characterize a particular process that runs on the tool. In one example, data may be gathered over one or more "good" process runs. These are process runs that are determined to be good according to some measured result. For example, in semiconductor processing, a "good" process may be one that produces a substrate that is within some specification for film thickness, uniformity, reflectance or sheet resistance. Alternatively, device performance of integrated circuits formed by a process may be measured to determine whether the process was "good." The criteria for a "good" process may be any criteria that a user selects as indicating that the process runs are satisfactory.

A typical process run comprises a series of steps that are carried out within a process chamber while a substrate is present. Examples of process runs in the semiconductor industry include a deposition process in a chemical vapor deposition chamber or a Plasma Enhanced chemical vapor deposition chamber, an etching process in a plasma etch chamber, an ion-implantation process in an implanter or a patterning process in a photolithographic stepper. Some process runs, such as in-situ cleans, may occur without a substrate being present. Other examples of processes that may occur without a wafer are pumpdown of a chamber, regeneration of a cryopump, or some other process that takes place prior to placing a wafer in a chamber or after a wafer is removed from a chamber. Process modules are not limited to single-wafer chambers but also include batch processing modules such as vertical furnaces or wet-clean stations. Modules also include apparatus such as photoresist spinners and metrology systems that do not contain wafers within an enclosed chamber. Typically, the same process is run repeatedly in the same chamber. Thus, a deposition chamber repeatedly deposits the same film using the same process over and over. Each time a particular process is run, there is some variation in the process parameters. While some variation is acceptable, excessive variation may indicate a problem with the chamber that may cause defects in substrates produced by the chamber. Gathering data over multiple process runs of the same process allows the degree of variation to be monitored. Therefore, data is generally gathered over multiple wafers, typically at least one lot of wafers. A lot typically consists of 23-25 wafers, so that 25 process runs or more can be used to provide adequate training data. In one example, four boats of silicon wafers (100 wafers) are processed to provide "good" data. The data gathered over these "good" process runs may be considered "teaching" data because these data are later used to teach an analysis system to recognize "good" process runs and to characterize a process run relative to "good" process runs. Data may be collected in the form of one or more sets of time-series data from one or more sensors. A set of time-series data is a waveform that indicates the value of a measured process parameter as a function of time. There is a trend towards smaller process lots sizes with few substrates or wafers. The ability to train on smaller lot sizes is desirable. A reduced set of training data for modeling and setting simpler thresholds is needed for the smaller lot sizes, until ample data is gathered to expand the model robustness with an increased number of observations.

Development of a "Model"

Data from multiple "good" process runs may be analyzed to obtain a model of a portion of process data. The data may be transferred to a unit such as a personal computer that runs software that analyzes the data. While teaching data may be gathered using sensor network 100 of FIG. 1A or other hardware described above, the techniques of data analysis described herein are not limited to data obtained from any particular hardware or tool configuration and may be applied to data collected by any suitable means.

Data analysis using Multivariate Analysis (MVA) is one possible way of extracting information from raw data. Typically, MVA involves complex analysis of the relative changes in and/or between different parameters during a process. Measurements may be made of many different process parameters some of which are interrelated. Software for MVA may be complex and typically requires considerable processing capacity. Alternatively, data analysis may be carried out using Univariate Analysis. This involves analyzing one process parameter as a function of time. Thus, fewer sensors may be used (as few as one) and the data collection and analysis functions are simplified. The platform used to perform analysis may be simpler and cheaper and the analysis may be performed rapidly. Univariate analysis may be performed on more than one process parameter at a time. Unlike multivariate analysis, univariate analysis of multiple inputs does not analyze relationships between inputs but treats each input separately.

Figure 2:
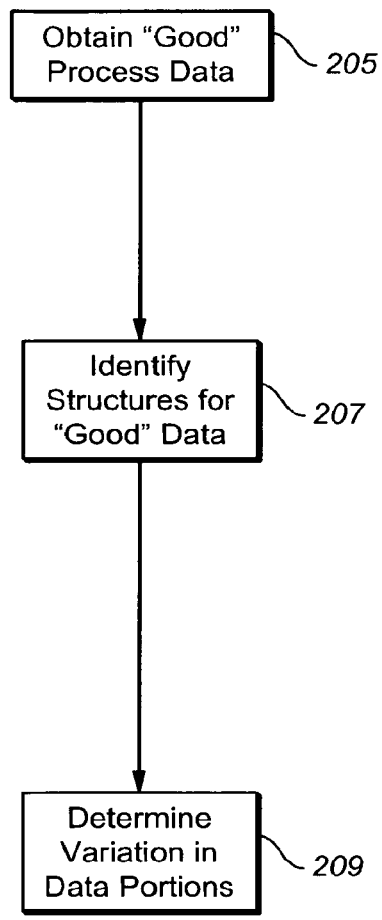
FIG. 2 shows steps in operating a data collection system such as that shown in FIG. 1A.
Figure 2:
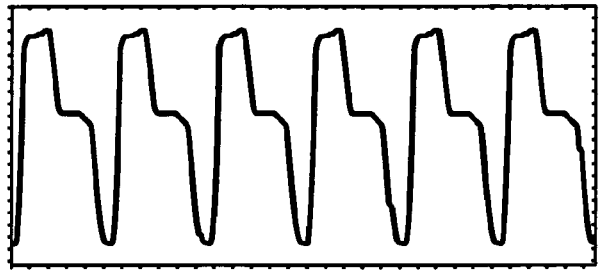
Figure 2:
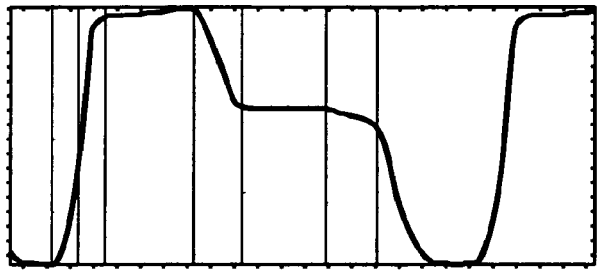
Figure 2:
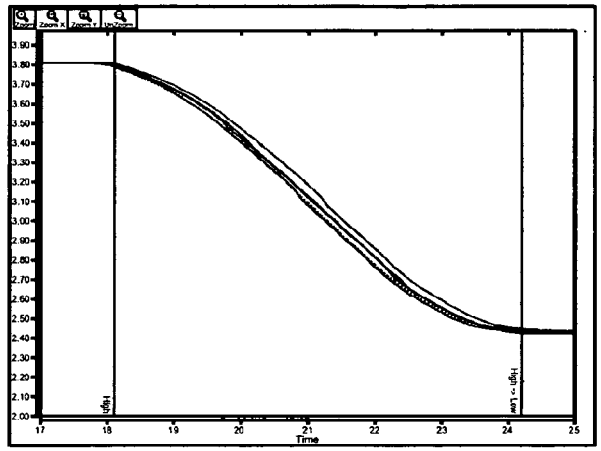

FIG. 2 shows a process flow for developing a model of time-series data. Teaching data that is known to be "good" is first collected 205 then portions of teaching data are identified with predetermined structures 207. Corresponding portions from different process runs are overlaid and compared to determine the variation in the data portions 209. The pattern of data in a portion along with the variation observed between corresponding patterns in different process runs provides a model for data from a "good" data run.

In one example, patterns within the teaching data are identified and classified as corresponding to predefined structures. Examples of such structures include constant value (zero order polynomial), straight-line (linear) increase or decrease (first order polynomial), third order polynomial, higher order polynomials (fourth, fifth, sixth etc), exponential, triangular, sinusoidal, trapezoidal and logarithmic. Other mathematical representations such as Legendre polynomials, shifted Legendre polynomials and others are applicable as well.

A waveform may be deconstructed into a set of weighted basis functions. This set of basis functions is referred to as a basis set. The weightings are referred to as coefficients. A single weight multiplies a single basis function, i.e. there is a one to one correspondence between weighting coefficients and basis functions. The number of polynomials included in a basis set is called the model order. As the model order increases, i.e. more basis functions are included in the basis set, the previous coefficients may change. In an orthogonal basis set, each basis function is orthogonal to every other basis function, therefore as more basis functions are added, the coefficients associated with the previous basis functions do not change. Legendre Polynomials may be used to form an orthogonal basis set. The range over which Legendre Polynomials are defined is between −1 and 1. Shifted Legendre Polynomials may be used for modeling waveforms. Shifted Legendre Polynomials are defined over the interval between 0 and 1. The 0th order Shifted Legendre Polynomial is a constant. The 1st order polynomial is a shifted, inclined straight line. The 2nd order polynomial is a quadratic. The higher order polynomials follow this same pattern. The even orders are even functions, and the odd orders are odd functions. In general, the higher order polynomials may be thought of as representing finer details of the waveform. The coefficients corresponding to the existing polynomials do not change when another polynomial is added to the orthogonal basis set. If the orthogonal basis set is formed by starting with the 0th order polynomial and then monotonically increasing both the model order and polynomial order, then "goodness of fit" criteria may be used to determine the desired model order. Adding more polynomials may decrease the root mean square (rms) modeling error, but the decrease of rms error may not be significant enough to justify the inclusion of the higher order polynomials. Shifted Legendre Polynomials offer several advantages when used to form an orthogonal basis set. They span the range over which many useful waveforms are defined. The coefficient of each polynomial may be calculated independently of any other coefficient. Higher order polynomials may be added to the basis set to decrease rms modeling error without affecting lower order coefficients. The calculation of the coefficients is quite straightforward. Singular Value Decomposition (SVD) is one suitable method for that purpose.

An example of a constant value is $y=k$, a straight-line increase or decrease may be $y=mx+k$ and a third order polynomial may be $y=ax^2+mx+k$. While higher order polynomials or other mathematical representations may allow a more exact fit, it is desirable to identify a portion of data with a lower order polynomial where possible. High order polynomials may be limited (going only as high as sixth order polynomials for example) and software may be configured to choose a lower order polynomial even where this results in a poorer fit than might be obtained with a higher order polynomial. The structures used may be defined by a user. The structures provide a limited selection of possible shapes that may match the shape of a portion of data. Thus, a portion of data may be identified as corresponding to a predefined polynomial or a constant value or some other structure from a finite list of structures. The list of predefined structures may include structures such as one that apply to oscillations, dampened oscillations, noise and others. This type of matching of portions of data to predefined structures may be considered to be a form of syntactic pattern recognition. Additional structures may be formed from combinations of the structures listed above or from similar simple structures. Thus, a constant structure followed by a polynomial structure could be considered as a single structure.

Figure 3A:
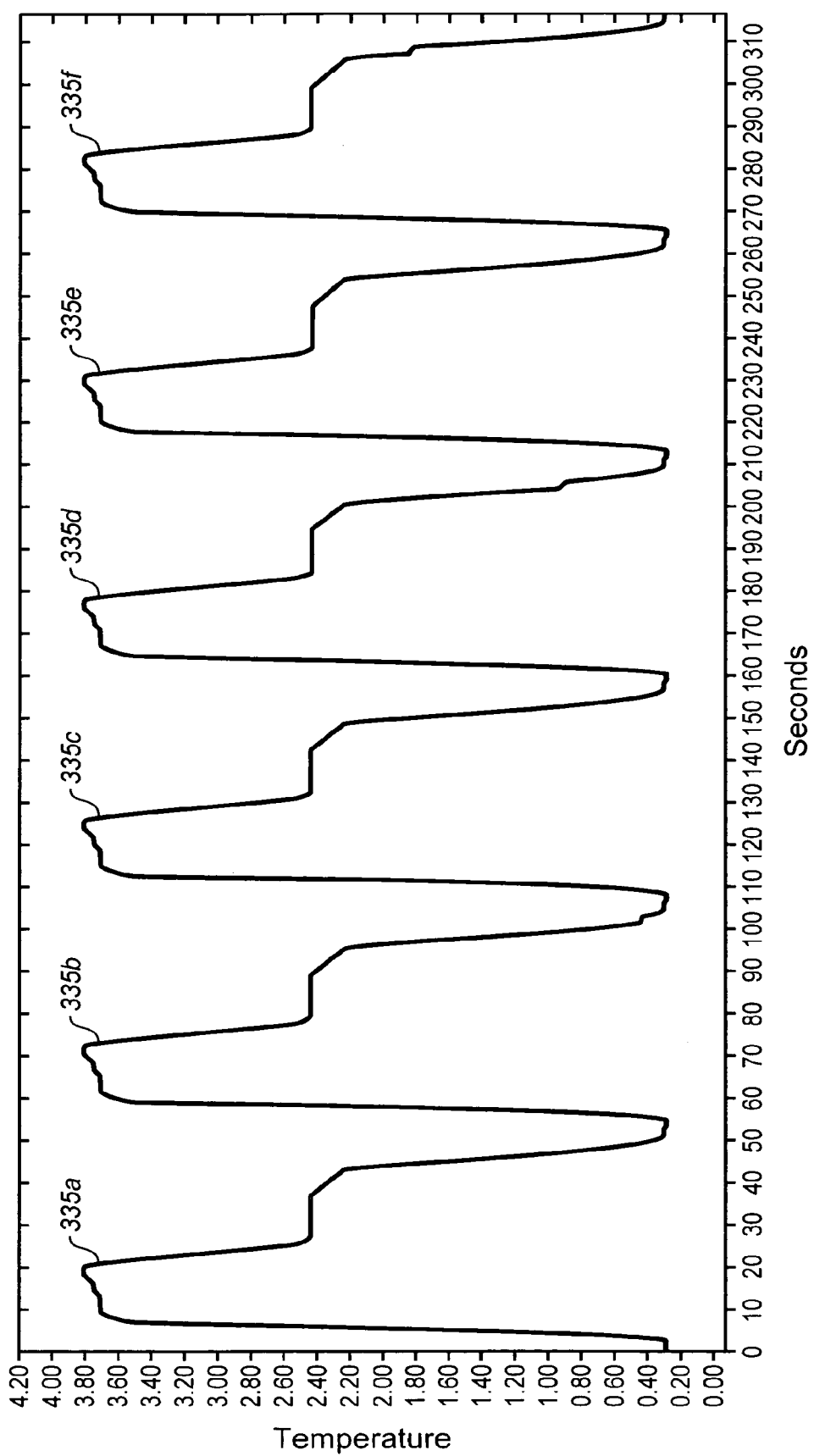
FIG. 3A shows a set of time series data collected in the manner shown in FIG. 2.
Figure 3B:
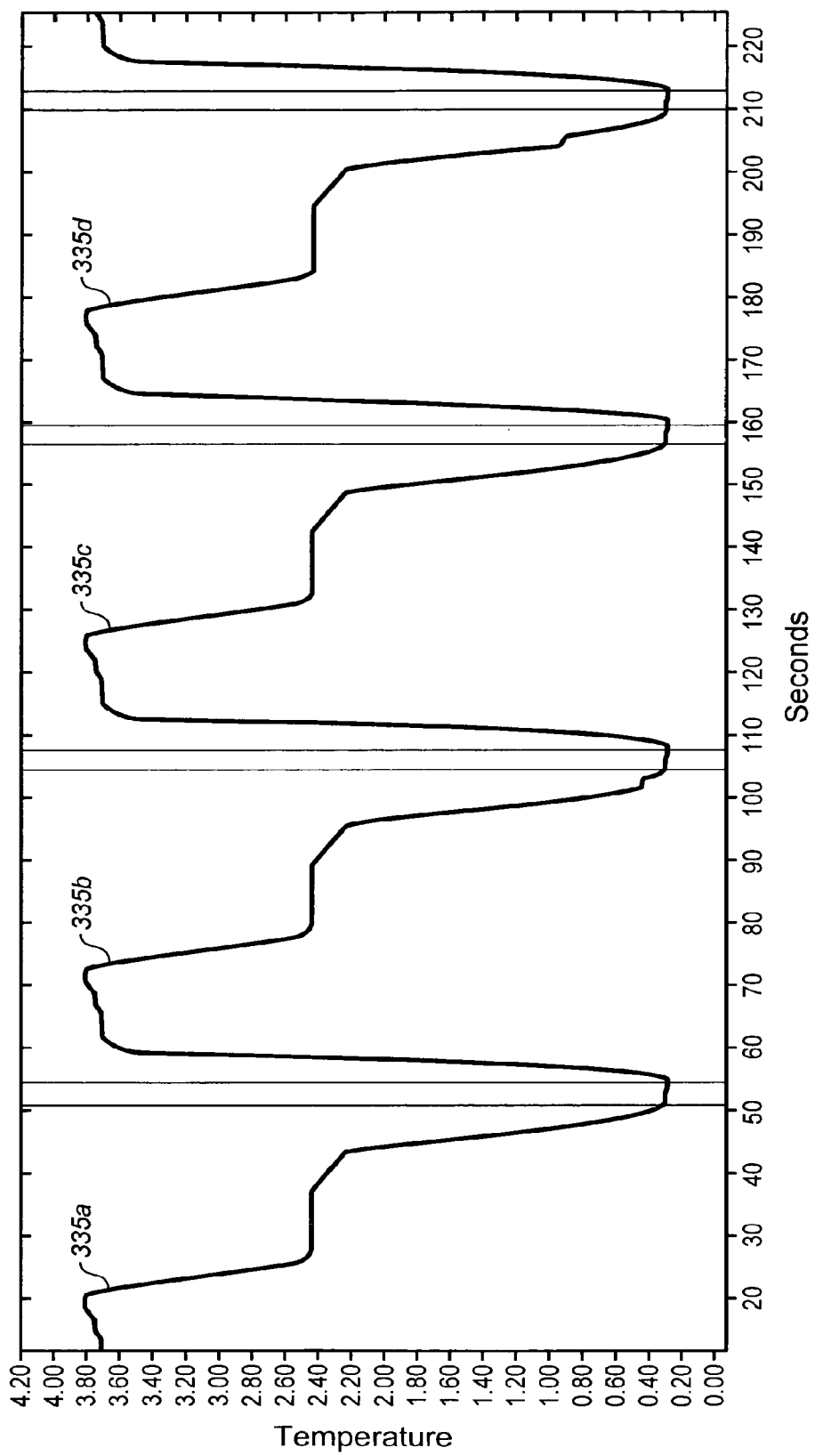
FIG. 3B shows the data of FIG. 3A having boundaries identified that separate individual waveforms.
Figure 3C:
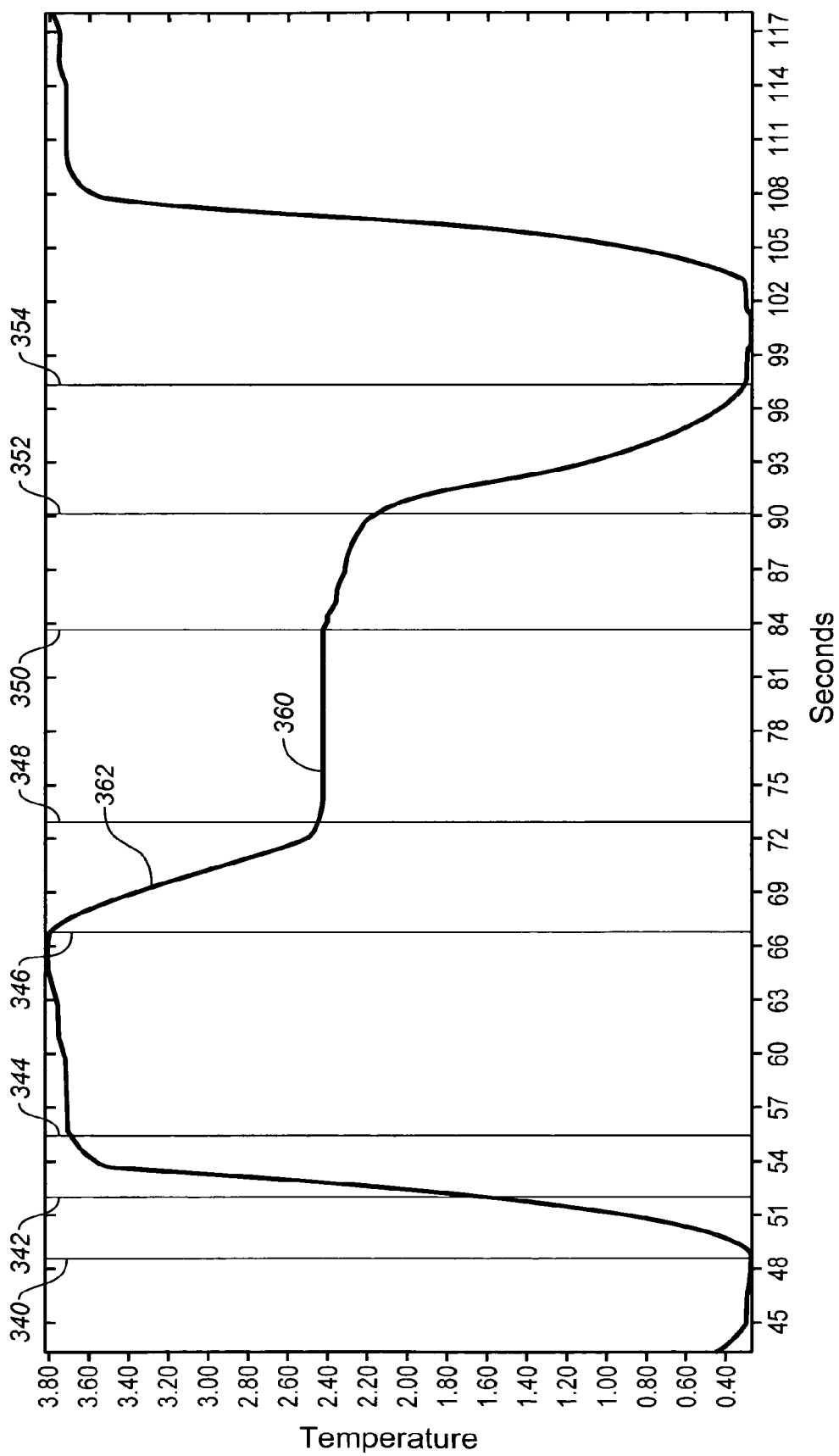
FIG. 3C shows a waveform of FIG. 3B having predefined structures associated with individual portions of data.

FIG. 3A shows time-series data reflecting measurement of a process parameter in a process module. The data shows a series of waveforms 335a-335f corresponding to successive process runs in a process module. FIG. 3B shows the waveforms 335a-335d for the different process of runs FIG. 3A separately identified. The identification and separation of waveforms may be done by a user, based on visual inspection, or may be done by software. FIG. 3C shows a waveform 335a of FIG. 3B in which boundaries 340-354 between structures have been identified. Boundaries 340-354 separate portions of data that correspond to different structures. Thus, a portion of data 360 extending from boundary 348 to another boundary 350 may be identified with a constant structure while a neighboring portion of data 362 extending from boundary 346 to another boundary 348 may be identified with a straight line decrease.

Boundaries between portions of data such as boundaries 340-354 may be identified by a change in slope or a result of a slope calculation of the time-series data, or by some other mathematical method such as Piecewise Linear Representation (PLR), Sliding Window approach, Top down approach and the Bottom Up approach. Thus, where an inflection point occurs in the data, a boundary may be placed at that location by the analysis system. For example, boundary 342 occurs at a point where a slope in the data changes from curving in one direction to curving in the opposite direction. Once boundaries are positioned, portions of data between boundaries are then compared with predefined structures to determine which structure best fits the portion of data. Alternatively, a user may manually place boundaries at particular locations based on the visual appearance of the data. The data may be displayed on a screen in a format that clearly shows the data in graphical form so that inflection points may be identified. The user may adjust the locations of boundaries to optimize the locations of the boundaries and thereby optimize the fit between predefined structures and portions of data. Thus, a user may see data in a similar format to that shown in FIG. 3C and may be able to move boundaries between data portions by dragging them with a cursor or some other method. In one embodiment, a user first sets a location of a boundary and then an automated search is performed within a predefined search radius of the location to optimize the boundary location for better fit.

Boundaries of the portions of data may be adjusted to obtain a better fit between the portions of data and the predefined structures. Adjusting the boundaries of one portion of data changes the boundaries of the neighboring portion of data so that both portions are evaluated for goodness of fit after adjustment. Also, when such an adjustment to a boundary is made, the data portions may be reevaluated to see if the correct structure is identified. It is possible that after adjustment, a structure that was previously identified as corresponding to a portion of data is no longer the structure that fits best. Therefore, after adjustment of a boundary, data portions may be compared with all predefined structures to see if a better fit may be obtained with any other structure. All data portions may be compared again after changing a boundary or some subset of all data portions may be compared. A sum of squares modeling error (fit error) may be obtained and recorded with respect to each boundary location. Thus, identification of structures within portions of data is optimized through successive adjustments of boundaries and comparison with the selection of predefined structures.

Figure 3D:
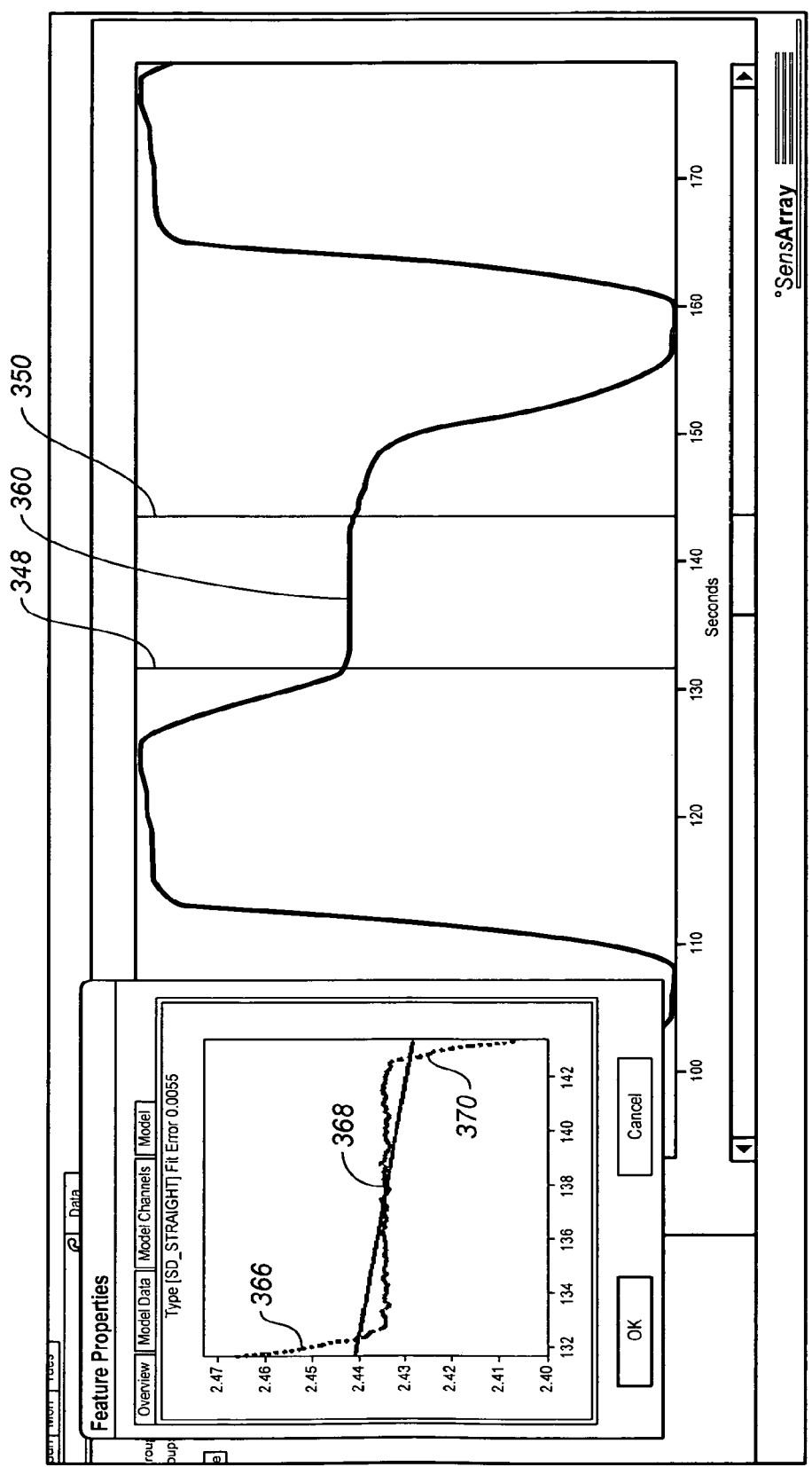
FIG. 3D shows a portion of data of FIG. 3C identified with a straight-line structure.
Figure 3E:
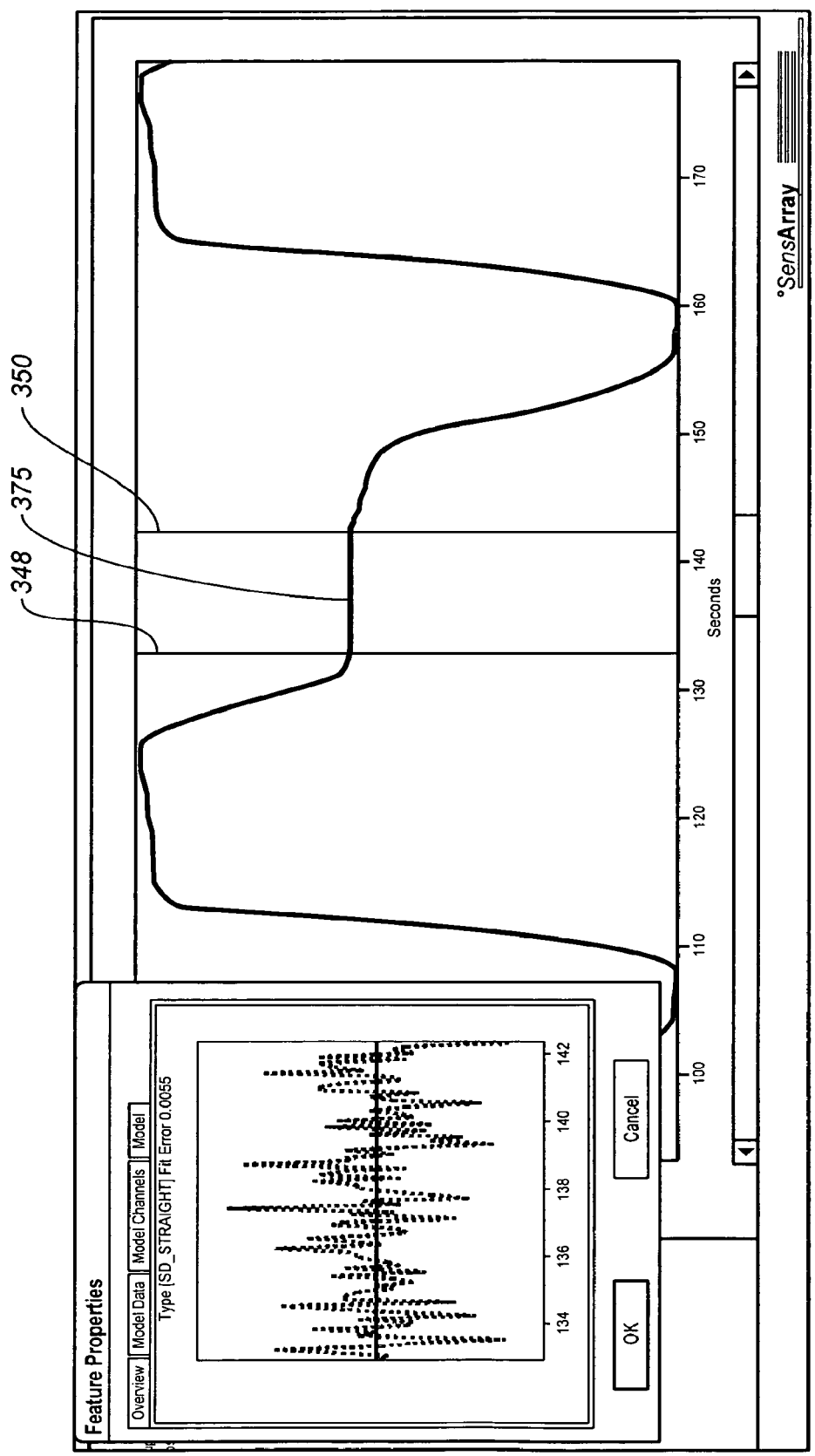
FIG. 3E shows the portion of data of FIG. 3D with modified boundaries having a better fit with a straight-line structure.

FIG. 3D shows a portion of data 360 of a waveform identified with a straight line. The portion of data may be compared with each structure in a list of structures to determine which one gives the best fit. As can be seen in FIG. 3D, the boundaries 348, 350 of the portion of data 360 are positioned so that the portion of data 360 includes a straight line decrease 366 on the left, a middle portion 368 that is approximately flat and a straight line decrease 370 on the right. Such a combination of different shapes within a portion of data indicates that the boundaries may not be placed in optimum locations. Also, the fit error for this portion of data is 0.0055 indicating that the straight-line structure is not a very good fit for this portion. FIG. 3E shows a portion of data 375 that is similar to the portion of data of FIG. 3D but has boundaries 348, 350 repositioned so that the straight-line decreasing parts 366, 370 are not within the portion of data 375. Portion of data 375 is identified as a constant. The fit error of 0.0005 indicates that a constant structure is a good fit for this portion of data. The y-axis has been modified from FIG. 3D in the "Feature Properties" window to fit the range of the data and better show the small variations within the data portion.

Figure 3F:
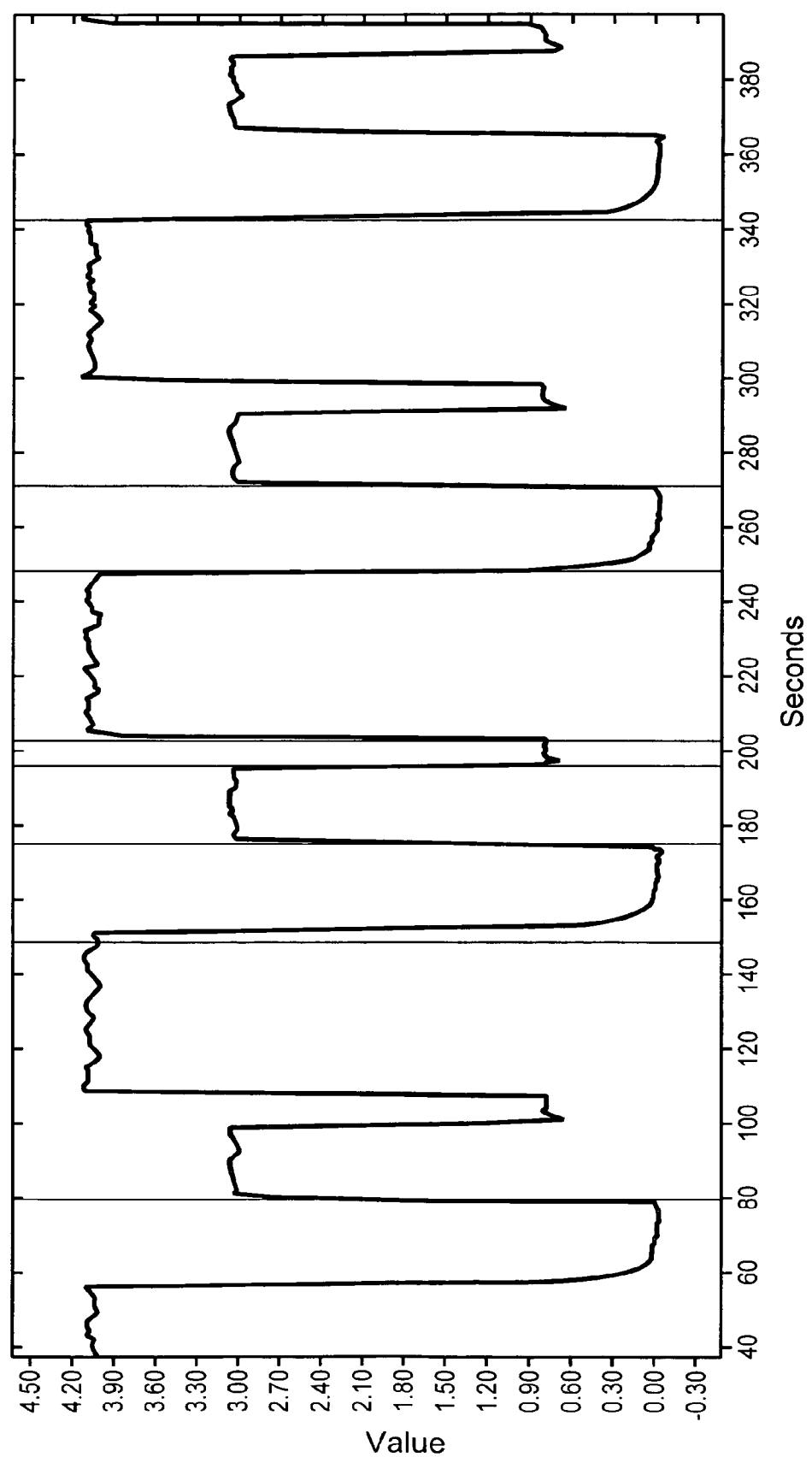
FIG. 3F shows waveforms for Oxygen flow rate during repeated running of the same process.

This technique may be applied to a variety of different waveforms and is not limited to any particular type of waveform. FIG. 3F shows waveforms for Oxygen ($O_2$) flow rate during a series of process runs. Boundaries are identified within a waveform and structures are identified with portions of data between those boundaries as before.

If a portion of data from one process run (or a statistical representation from a population of process runs) is identified with a particular predefined structure, the corresponding portion of data from other process runs of the same process should also be identified with the same predefined structure. Thus, once boundaries and structures are identified for data from a first process run, subsequent process runs should have data with boundaries in approximately the same locations and with portions of data that correspond to the same structures identified with the data from the first process run. Once a data pattern corresponding to a predefined structure is identified in portions of data from multiple process runs, the portions of data may be analyzed to find the variation in the data pattern. The technique of time stretching of data patterns is often used to adjust pattern boundaries as in speech recognition and to accommodate undesirable results from undersampled or non-uniform data collections. Time stretching methods can be employed, when applicable, for time-skewed data where the amount of difference or irregularity is large. An embodiment of the present invention provides a method to allow or tolerate acceptable small amounts of variations in data sample population without the use of time stretching. In the case of process chambers that intentionally alter the time duration of a step in a process, structure types are provided that accommodate time varying features. Such structures may have time limits that are derived from teaching data collected over multiple process runs. The most common time varying portion of a process step is often referred to as the "End Point" meaning that the End of a process step has been observed by some sensory capability and that step has been stopped (instead of running that step in a process recipe for a regimented or set time period) allowing the process to continue to the next step or conclude. Thus, for example, a plasma etch step that ends when an optical sensor detects a change in the plasma may last for different times from one wafer to another. Typical variation may be observed in data from teaching wafers and limits may be set according to the variation. Structures that allow a wide range of time variation are simpler to implement than time stretching methods.

Figure 4A:
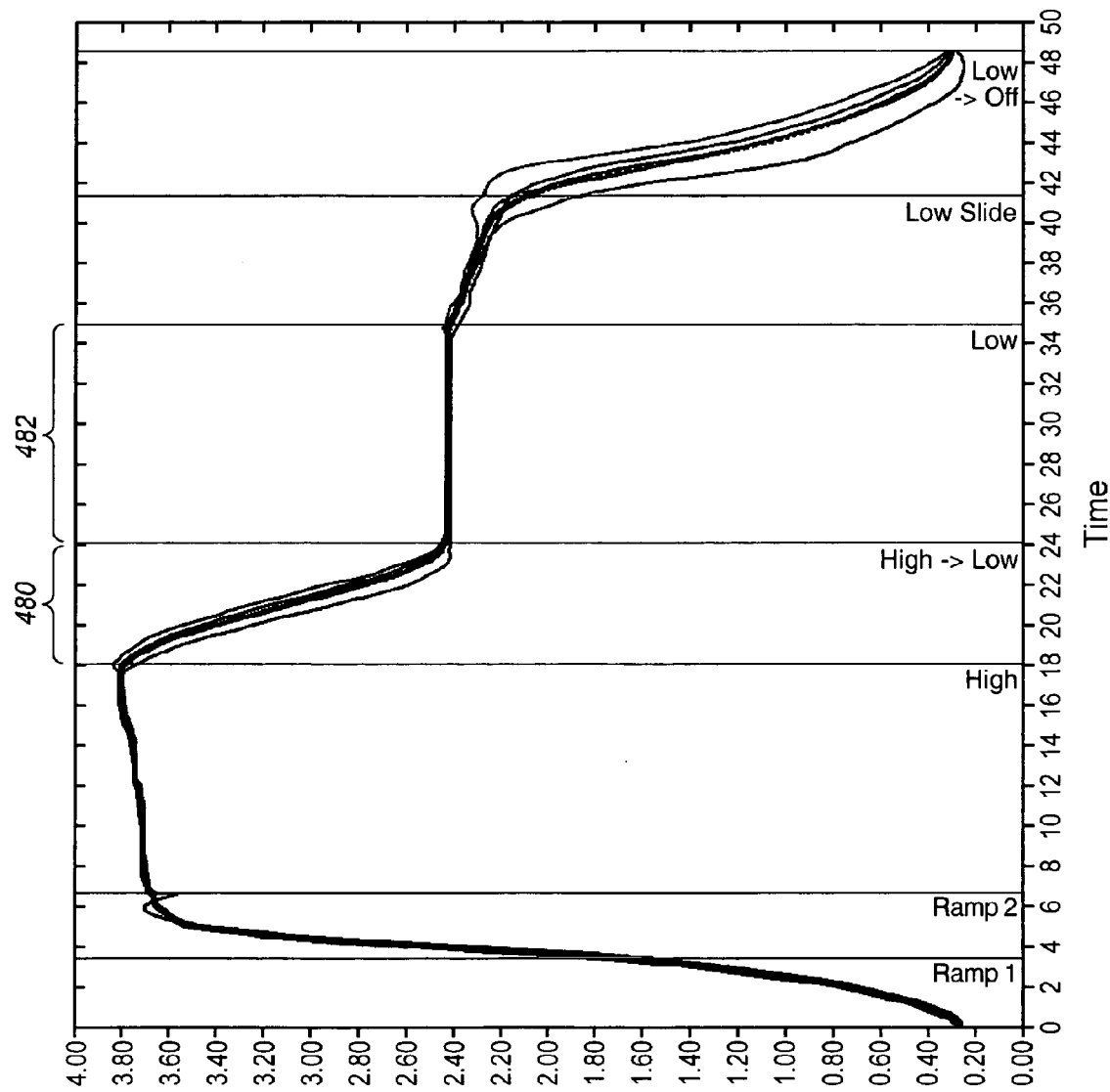
FIG. 4A shows a waveform of FIG. 3A overlaid with other similar waveforms.
Figure 4B:
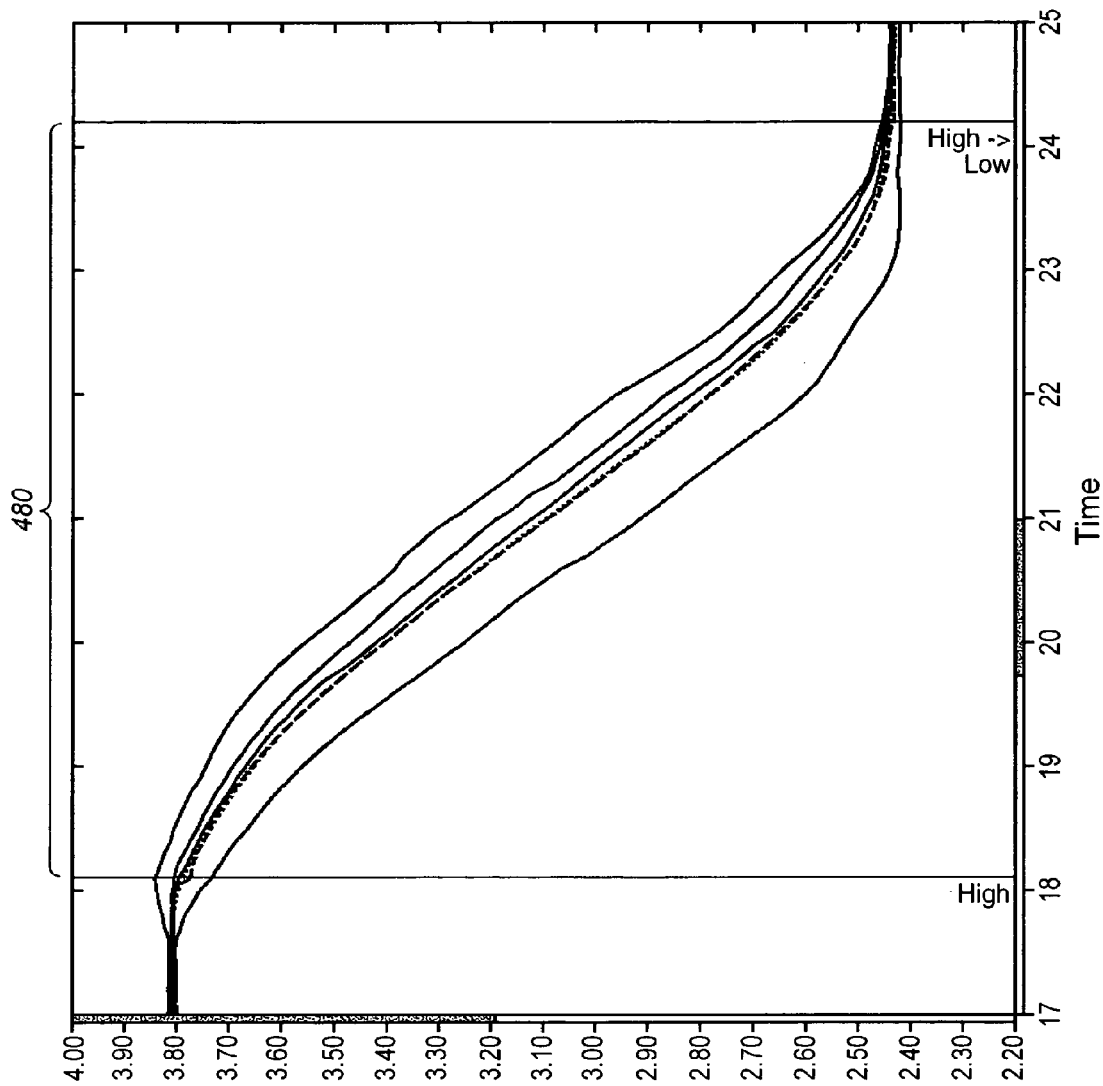
FIG. 4B shows a portion of data shown in FIG. 3 overlaid with other similar portions of data from other process runs.

FIG. 4A shows multiple waveforms, corresponding to multiple process runs, overlaid so that a data portion overlies corresponding data portions from other waveforms. In most applications, multiple waveforms (e.g. 25-100 waveforms) are used to determine normally occurring variation in data portions. The data used to determine normally occurring variation is also called "Training data" or "Teaching data." It can be seen that certain data portions have more variation from waveform to waveform than other portions e.g. portion 480 has more variation between waveforms than portion 482 has. FIG. 4B shows a group of portions 480 of data from FIG. 4A. Stacking similar portions of data in this way allows a user to verify that boundaries have been correctly located and the teaching data is acceptably uniform from one data run to another.

The variation may be expressed in terms of variation in parameters determining the shape of the structure. For example, where portions of data correspond to a straight line they may be described by the equation $y=mx+b$. The variation may be given in ranges of values for the constants m and b. Thus, a model for this portion of data may be expressed as $y=mx+b$ with some range of m and b. In the case of time-series data used here, the x-coordinate is time (t). The range of time of a particular portion of data may also have some variation because the boundaries of the portion may not perfectly coincide from one process run to another. Therefore, the model may also have a range for time (t). Time may be treated as another parameter for analysis of variation. A model derived from multiple process runs in this way may be considered a composite model. Forming a composite model may be considered a form of lossy data compression because the composite model represents the shape of the data from multiple process runs in a more compact way. In some cases a model may be derived from a single process run and used for tool health monitoring. However, a composite model allows limits to be set that represent measured variation in data.

In one embodiment, a mean vector and covariance matrix are derived for each portion of data in the teaching data. The mean vector represents the mean values of parameters including constants in the polynomial or other mathematical representation identified with the portion of data and time parameters for the boundaries of the portion of data. The covariance matrix represents the variation in the parameters over the different waveforms of the teaching data. Each row of the covariance matrix corresponds to a different waveform and each column corresponds to a polynomial or mathematical term. The inverse of the covariance matrix may be calculated using standard techniques. Thus, a composite model may be represented as a mean vector and a covariance matrix.

In one embodiment, a portion of data may vary in length from one data run to another but still be considered "good" data. Normally, where a portion of data is different to corresponding portions of data from different process runs it is an indication that there is a problem with the process. However, some process steps may last for a variable period of time and it is desirable to be able to treat such data as "good" data and not as an indication of a fault in the process. Therefore, certain portions of data may be designated as being of variable length and the boundaries of these portions may be determined separately for each process run and may be located at different points. A variable length portion of data may correspond to any structure used. For example, where a portion of data is identified with a constant, the time for that portion of data may vary between 10 and 15 seconds for different process runs. The time variation for this portion of data is modeled so that a range is obtained that can provide a model of the data portion. A portion of data may be recognized by a user as being of variable length or may be identified as variable length by the software.

Tool Health Monitoring

The use of time-series data analysis or univariant data analysis provides a simple and effective method of monitoring tool health. Methods to analyze time series data and to develop models to use for tool health monitoring based on time series data provide capabilities not provided by multivariant methods.

When teaching data have been analyzed to obtain a model of observed process parameter measurement during known "good" process runs, this model may be used to determine whether subsequent process runs are "good" and to determine how closely a subsequent process run compares with the teaching process runs. A user may determine acceptable limits for "good" data based on the observed variation in the teaching data that is known to be "good." While all data falling within the limits observed in the teaching data are "good" by definition, data falling outside these limits may also be good. The teaching data may be used to derive a mean and standard deviation, or other calculated statistical values for each data portion. Limits may then be set based on the mean and standard deviation. For example, a process run might be considered "good" if portions of data of the process run fall within three standard deviations of the means for those portions of data. Alternatively, in initial set up conditions in the cases of small lot sizes that do not repeat often in the manufacturing process, there are 2 methods that can be applied. Simple limit thresholds can be set symmetrically or asymmetrically around each portion of the process waveform. This provides for operation while continuing to collect a larger set of training data. The other method is to employ the technique of adding artificially generated noise or randomness to the small collection of data or to add additional noisy data sets based on data sets in the small collection to simulate a larger data collection. Where only two data sets are collected, each one may be used to generate a copy that has additional noise introduced, thus providing four data sets. These four data sets may then be used to generate additional noisy copies to provide a larger number of data sets. This technique can be done successfully provided that it is done with ample knowledge of the process tool's behavior and the robustness of the manufacturing processes performed in the process tool.

Figure 5:
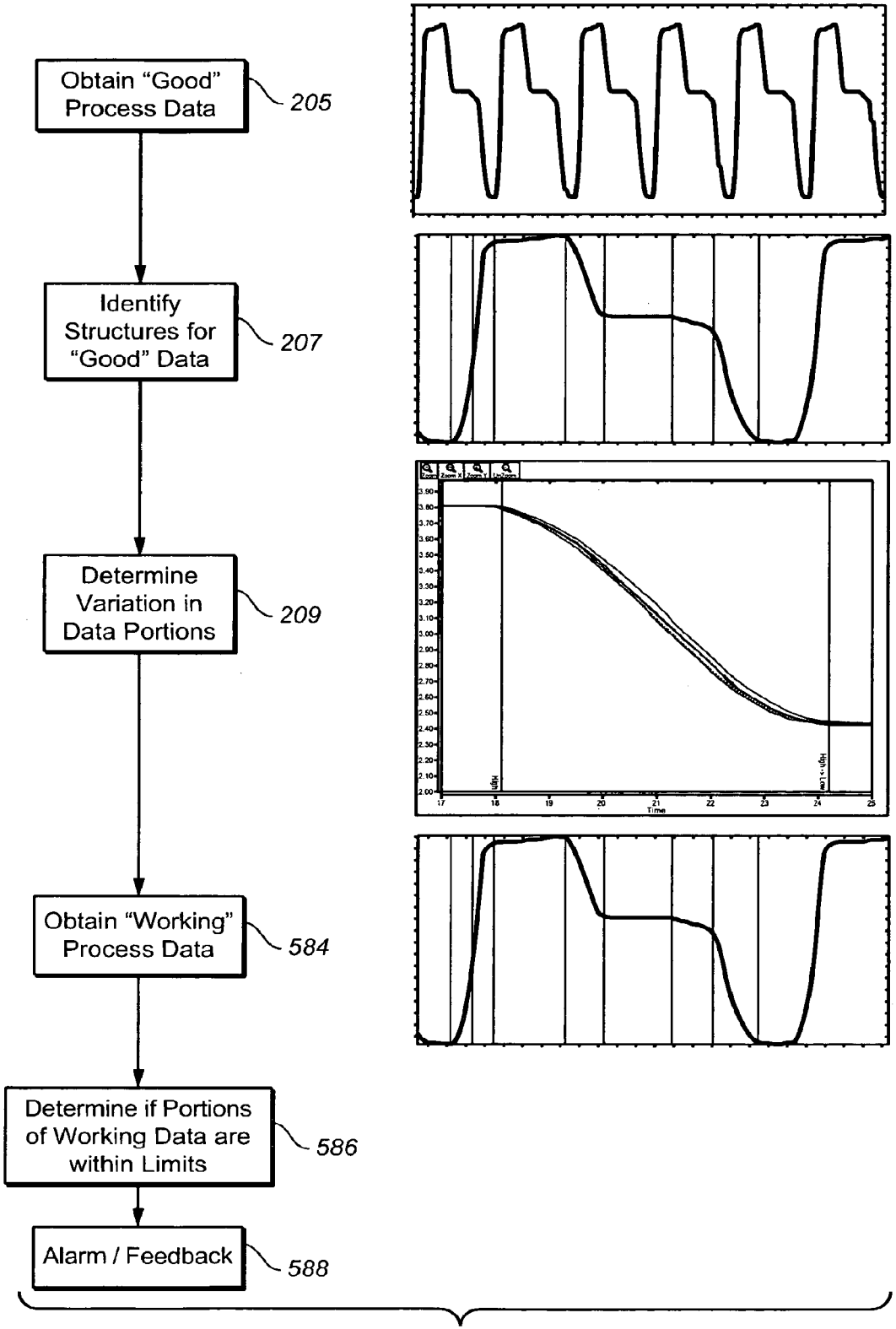
FIG. 5 shows the data collection of FIG. 2 with additional steps to show analysis of the data collected to evaluate tool health.

FIG. 5 shows a flowchart that includes tool health monitoring. "Working" data is obtained 584 from sensors. This may be done in the same way that teaching data was obtained. The "working" data should be similar to the teaching data if the process is "good." Therefore, the "working" data is compared with the model derived from the teaching data or from any limits derived from the model or set by a user 586. If the "working" data meet certain criteria the tool is considered to be in good health but if certain criteria are not met, the tool may be considered to be in an unhealthy condition.

Typically, tool health monitoring is carried out on a different platform to that used for deriving the model and setting up limits for tool health monitoring. In other examples, the tool health monitoring process is carried out on the same platform used for deriving the model and setting limits. A suitable platform for performing these combined functions is a laptop or tablet PC. Alternatively, a sensor network may be connected to a server that acts as a platform for tool health monitoring. The server may be located near the tool that has the sensor network, or may be located remotely and connected through a network such as a local area network, wide area network or the internet. The platform for tool health monitoring, known as an "aggregator," may be simpler than the platform used for the analysis described above. In one embodiment a Personal Digital Assistant (PDA) or other reduced form computer may be used as an aggregator. The aggregator may receive data from one or more sensors and compare it with models derived from the teaching data on the more capable PC computer. The aggregator may receive user input or configurations such as the model derived from the teaching data and any waveform pattern limits set by the user over a network connection, serial connection such as RS232, USB, or other communications connection or by using a removable data storage medium such as a removable flash memory card or hard drive. A degree of correlation may be derived from such a comparison. This correlation may indicate the health of the tool so that as long as the observed measurement data has a high degree of correlation with the model the tool is considered to be healthy. The aggregator may also determine tool health based on limits set by a user such as those defined by mean and standard deviation. A user may also define limits in terms of the units of the observed process parameter. For example, where temperature is the observed process parameter, a user may define temperature limits, or limits regarding the temperature profile in terms of temperature as a function of time. The aggregator may provide an indication of whether the tool is maintaining good health or is drifting away from a healthy condition. In this way, problems may be averted by detecting a trend that would lead to an unhealthy condition before that point is reached. Thus, a problem may be corrected before any misprocessing of substrates occurs. Health monitoring may be carried out in real-time or may be applied to data at the end of a process run or at some later time. In addition to determining tool health from variation in a process parameter over time, time variation in the signal may be analyzed for tool health in a similar manner. Thus, overall tool health may be based on both signal variation and time variation. For variable length portions of data, a model may define a portion of data as lasting for some acceptable range of time, e.g. 12-15 seconds or 20+/−3 seconds. This includes the time between processing of substrates, which is useful for process tool productivity information and process tool behavior analysis. Thus, embodiments of the present invention may be used for analysis of tool behavior not only during processing of substrates, but also during idle periods. For example, variation in queue time (delay, wait time or the interval before being processed in a chamber) for wafers may have an effect on the devices produced, so data regarding such delays may be useful. Also, variation in pumpdown time or base pressure could indicate a leak.

In one embodiment, comparison of a portion of working data with teaching data is achieved by identifying a structure corresponding to a portion of working data and deriving a vector representing the portion of data in a similar way to that described with respect to teaching data. The vector representing the portion of data is then compared to the mean vector for the corresponding portion of teaching data. This may be done using the Mahalanobis distance between these vectors or other statistical metrics. The mean vector is subtracted from the vector for the portion of working data to obtain a difference vector. The inverse covariance matrix is then pre-multiplied by the difference vector and post-multiplied by the difference vector's transpose resulting in a scalar Mahalanobis distance. This is a standard technique and is described by Richard O. Duda and Peter E. Hart in "Pattern Classification and Scene Analysis," John Wiley & Sons, New York (1973) The Mahalanobis distance may be scaled by dividing the distance by the number of terms in the polynomial for the portion of data. Thus, where a third order polynomial is identified with the portion of data, the Mahalanobis distance would be divided by three. This scaled Mahalanobis distance is then compared with a threshold to determine if the portion of working data is within predefined limits or not. A scaling technique may also apply a mathematical function to the values of the resultant constant and terms of the mathematical representation of a pattern. The use of a function can provide for increased sensitivity to elements of the pattern representations. A threshold may be determined from the variation in the teaching data or may be entered by a user. Other statistical techniques may also be used to compare a portion of working data with teaching data to determine whether the data exceed a threshold. A mean value for a measured process parameter may be obtained for a series of points along a waveform. The difference between working data and the mean value at each point may then be determined. If the sum of such differences exceeds some limit for a portion of data, this may indicate an anomaly.

Working data from a data collection system may be stored for some later use such as statistical process control or for later determination of the source of any problem in the manufactured product formed by the process when it is tested. Raw data may be stored directly. However, this may take up a large amount of storage space and produce large file that are not easy to handle. An alternative is to store the information derived from the data analysis as a compressed form of the raw working data. Because different data portions are identified with data structures and a degree of correlation with the structure is determined, the waveform may be rebuilt with some accuracy from the stored list of structures and correlations. While this is a lossy data compression technique, it may provide a meaningful utility for some applications. Both the raw data and the modeled results of the data can be saved for later review to build confidence in the accuracy of the representation.

Pattern recognition may also be used to detect the start of a process run or the start of a particular step within a process run. In some cases, a separate signal may indicate the start of a process run. For example, a digital or analog signal from the tool or some other monitored action may indicate that a process has begun. Pattern recognition may also recognize a particular recipe where the same chamber or module runs different processes. For example, a module may perform two different etch recipes. If teaching data are collected for only one recipe, then any other recipe may appear to be outside limits and to indicate some problem. However, if teaching data are collected for more than one recipe, the software must either be told which recipe is running, or be able to recognize different recipes by their characteristic data patterns. Thus, teaching data may be collected for various processes in the same module and the teaching data for each process may be broken into data portions and identified with predefined structures as described above. When a process run starts, the software may recognize the process from the patterns in the data collected and continue to analyze the data by comparing with the teaching data for that process. When data is received that is not recognized, the software may continue to log the data and in some embodiments may send an alarm indicating that an anomalous condition has occurred in the module.

In some cases it may be advantageous to have different analysis weighting functions for different portions of data. Some portions of a process may be more important than others. Typically, a process is made up of several steps, some of which are critical and some of which are less important. The operator or analysis software may apply different limits to these different portions of data. The most critical portions of data may have extremely tight limits set so that any deviation from known "good" data will be considered to be an indication of a problem. On the other hand, certain portions of data may have wide limits so that a large deviation from known good data is allowed. Some portions of data may even be completely ignored so that any deviation in these portions is not considered in evaluating tool health. Weighting functions may be applied so that the health of a process run is calculated from a sum of weighted factors from individual data portions. Thus, important data portions corresponding to critical parts of a process may be given a heavy weighting while data portions corresponding to less critical parts of a process may be given a lesser weighting. Some portions may be ignored. Limits may be applied to patterns or structures in a pattern in an asymmetric manner so that the allowed variation in one direction is different to the allowed variation in the opposite direction. For example, where a portion of data is identified with a constant voltage of 5 volts, limits might be set at +1 volt/−2 volts, giving a range of 3-6 volts.

FIG. 5 shows the result of comparison between working data and teaching data being used to provide feedback or to trigger an alarm 588. In one embodiment, the aggregator may be used to provide feedback to modify one or more process inputs. Thus, for example, where temperature is rising and is approaching a limit or has exceeded a limit, the aggregator may provide a feedback signal or communication that is used to reduce heating in a process module. This may be in addition to, or instead of any feedback mechanism already in place as part of the tool's control system.

In one embodiment, the aggregator may provide an alarm to a user when a process parameter exceeds a limit or meets some predetermined condition. Different levels of alarm may be used to indicate different conditions. A data collection and analysis system may be used to provide information on what portion of the process run exceeded a limit. This may help in diagnosing the source of the problem. For example, if a pressure drop during pump-down of a vacuum chamber was outside of a limit because the chamber was pumping down too slowly, this might indicate a leak or a problem with the vacuum pump. An alarm may consist of a visual indicator such as a red light, a signal sent via a network or some other indication that may be observed by a user. In some cases, an alarm may stop the tool from continuing to process substrates. Thus, operation of the tool may be aborted where the working data gathered by the data collection system is outside the limits set for the process. This may prevent misprocessing of substrates.

Figure 6A:
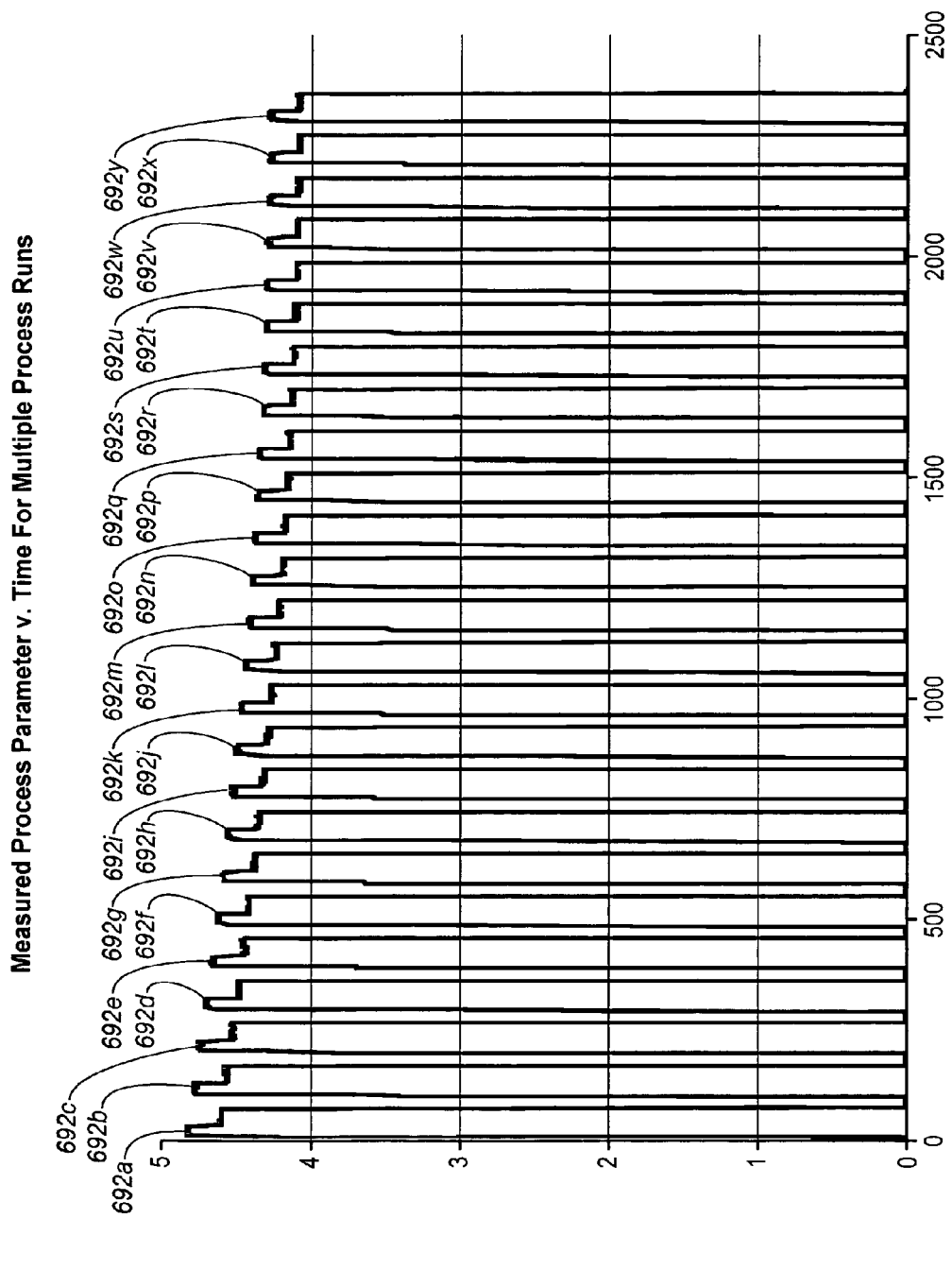
FIG. 6A shows a measured process parameter as a function of time for multiple process runs.
Figure 6B:
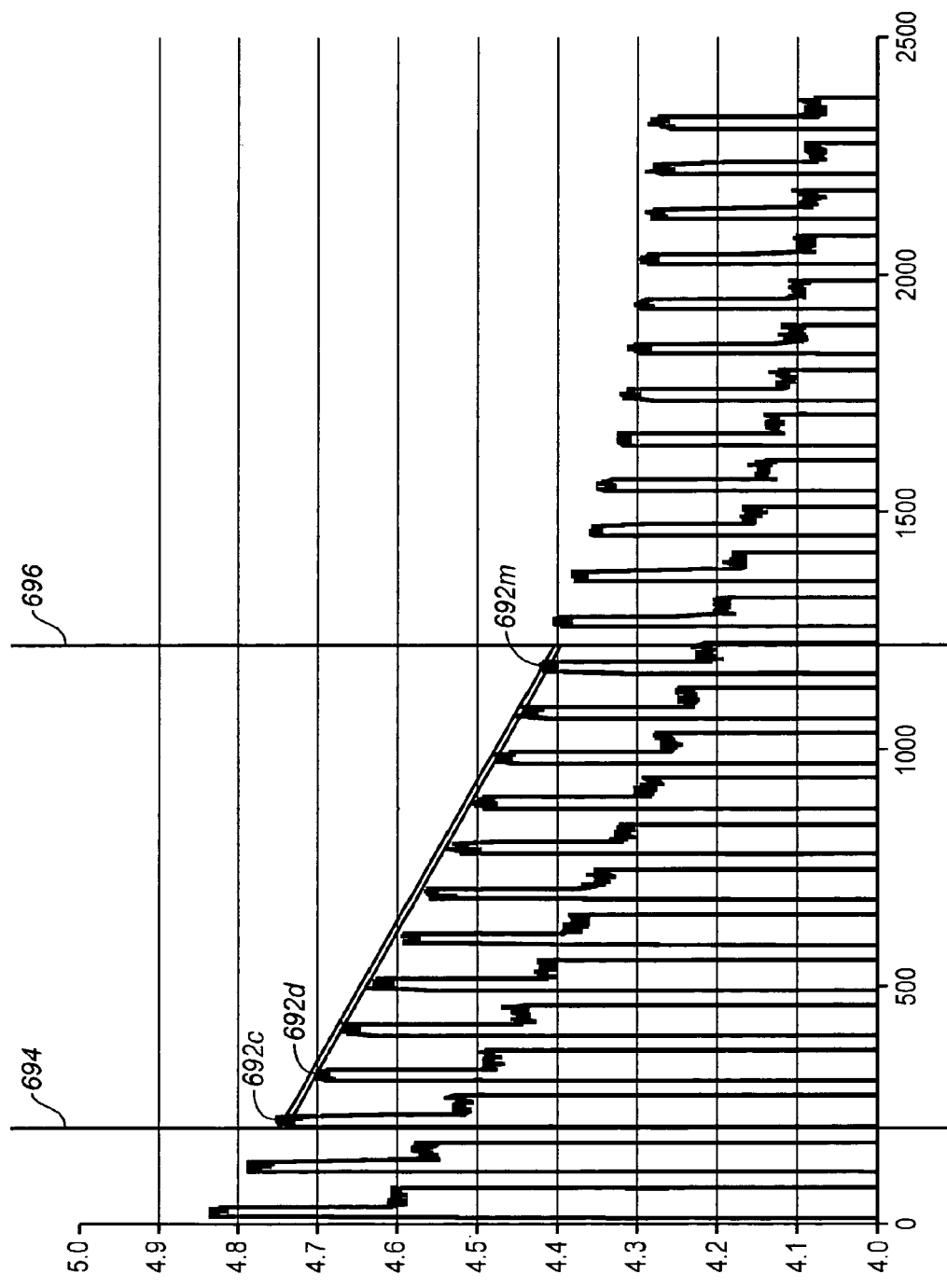
FIG. 6B shows the data of FIG. 6A scaled to illustrate run-to-run variation.

In addition to identifying and characterizing patterns within a waveform for a process run, the above technique may be used to identify and characterize patterns within a waveform for a series of process runs. FIG. 6A shows a waveform 690 for a measured process parameter over a lot (in this case 25 wafers). FIG. 6A shows a series of similar waveforms 692a-692y each of which corresponds to one wafer. A trend is visible from the waveform of the first wafer 692a to that of the last wafer 692y. FIG. 6B shows the same data displayed on a scale that makes the trend more visible. Trends in data patterns may indicate increased or decreased levels of noise or data pattern values. While the example of FIG. 6A shows a decreasing trend, an increasing trend or any other trend may indicate a condition of interest. The individual waveforms 692a-692y for each wafer in FIGS. 6A and 6B may be considered to be "good" data. However, the pattern of the data over all the wafers may still indicate some problem. If data are recorded over one or more lots of wafers running the same process, structures may be identified in the overall waveform for a lot and variation may be obtained. Thus, a variation may be found experimentally in known "good" data and limits may be set accordingly. For example, in FIG. 6B, boundaries 694, 696 are shown that define a portion of data that is identified as a straight line. Limits may be set for the straight line so that if data from a lot exceeds the limits, even though the waveform for each wafer 692c-692m is within limits, an alarm may be sent or an operator may be alerted.

Wafer-to-wafer data may also indicate that a particular process run is "good" or that a tool is healthy even though the process run exceeds a limit. One example of an anomaly within a lot is a "first wafer effect" where the first wafer or first few wafers processed in a module after a period during which the module is idle experiences different conditions to subsequent wafers. This may be because the module needs to warm up to run repeatably or for some other reason. A process parameter waveform recorded for a first wafer may exceed some limit because of these different conditions. However, recognition of the first wafer effect as a structure within the data for the lot may allow the system to consider tool health to be good even though the first wafer exceeds some limit. The first wafer can also be ignored for monitoring purposes or it can have a wider set of allowable tolerances. In some examples, a dummy wafer is run at the start of the lot to help condition the process tool so that the goodness of that first individual process run is not important. Thus, a false alarm that might otherwise be sent can be prevented by recognition of a pattern within a lot of wafers.

Structures may be identified over larger lots, or over longer periods spanning many lots. This may provide useful data. For example, preventative maintenance may be scheduled according to long-term patterns in a process parameter output. This improves efficiency because if preventative maintenance is done too frequently it reduces availability of the module, if it is not done frequently enough then wafers may be misprocessed and may be scrapped. Preventative maintenance may be scheduled based on the time interval from the prior preventative maintenance. However, there are many factors that can affect performance and time alone may not indicate the condition of a module. By measuring a process parameter over one or more maintenance-to-maintenance cycles, structures may be identified in the data and a particular structure, a change in the structure or set of structures that indicate that preventative maintenance is appropriate may be identified. A count of wafers or lots of wafers run through a process tool based on tool performance can provide an additional set of data for comparison to the observed patterns. Other data parameters that indicate tool usage such "RF hours," the amount of time of actual RF plasma generation or kilowatt-hours, the total power used, may be useful in combination with any trend observed.

As an alternative to using a sensor network such as sensor network 100 to collect data for tool health monitoring, a PCMD may be used. A PCMD resembles a production wafer that is used to make integrated circuits (similar size, shape and weight) but has sensors attached to measure the conditions experienced by the sensor wafer. A sensor wafer may be introduced into a process tool and may be subject to the same processes that a production wafer is subjected to. The conditions experienced during processing may be measured and recorded or transmitted for analysis. This method requires a break in processing of production wafers while the sensor wafer is processed. Thus, data is not available in real-time during regular operation of the process tool. Measurement may be affected by the differences between the sensor wafer and a regular wafer. However, the same techniques of data analysis may be used with data gathered by a sensor wafer to evaluate tool health and for troubleshooting particular problems.

While particular embodiments of the present invention and their advantages have been shown and described, it should be understood that various changes, substitutions, and alterations can be made therein without departing from the spirit and scope of the invention as defined by the appended claims. For example, the location and type of the sensors may be different than in the examples described.

The invention claimed is:

1. A method for determining a condition of a process in a substrate processing module, comprising:
obtaining a first set of time-series data from measurement of a process parameter during a first occurrence of the process in the substrate processing module;
obtaining at least a second set of time-series data from measurement of the process parameter during at least a second occurrence of the process in the substrate processing module;

identifying a structure corresponding to a first portion of the first set of time-series data, the structure selected from a finite set of structures;

identifying a first portion in each set of the at least a second set of time series data that corresponds to the structure;

deriving a composite model from the first portion of the first set of time-series data and the first portion of each set of the at least a second set of time series data;

obtaining a third set of time-series data from measurement of the process parameter during a third occurrence of the process in the substrate processing module;

determining a degree of correlation between a first portion of the third set of timeseries data and the composite model; and determining a condition of the process based on the degree of correlation.

2. The method of claim 1 wherein the first occurrence of the process is the processing of a semiconductor wafer that is subsequently processed to form semiconductor devices.

3. The method of claim 1 wherein the first occurrence of the process is the processing of a glass substrate that is subsequently processed to form a flat panel display.

4. The method of claim 1 wherein the degree of correlation is determined from comparison of the first portion of the third set of time-series data and the model, the model including a variation between the first portion of the first set of time-series data and additional sets of time-series data.

5. The method of claim 1 wherein the first set of time-series data and the at least a second set of time-series data are collected using one or more sensors mounted to a process chamber, the one or more sensors in communication with a controller over a network.

6. The method of claim 1 further comprising determining the locations of the boundaries of the portion of the third set of time-series data, the locations determined by modifying the locations to obtain good correlation with structures on both sides of each boundary.

7. The method of claim 6 wherein the composite model for a process of variable length has a range of acceptable time between boundaries.

8. The method of claim 1 wherein identifying the structure includes selecting a polynomial having an order from a plurality of polynomials of different orders, selecting the polynomial based on goodness of fit and the order so that the polynomial selected is not the polynomial that gives the best fit.

9. The method of claim 8 wherein individual polynomials of the plurality of polynomials are shifted Legendre polynomials.

10. The method of claim 1 further comprising deriving additional composite models from additional portions of the first set of time-series data and additional portions of each set of the at least a second set of time series data and determining additional degrees of correlation between additional portions of the third set of time-series data and the additional composite models.

11. The method of claim 1 wherein the degree of correlation between the first portion of the third set of time-series data and the composite model is determined by calculating a scalar Mahalanobis distance between a first polynomial that represents the third set of time-series data and a second polynomial that represents the composite model and dividing the scalar Mahalanobis distance by the number of terms in the first polynomial, or by a value derived from the first polynomial, to obtain a scaled Mahalanobis distance that is compared to a threshold distance.

* * * * *